US012398652B2

(12) United States Patent
Trivedi et al.

(10) Patent No.: US 12,398,652 B2
(45) Date of Patent: Aug. 26, 2025

(54) SEAL ASSEMBLY FOR A TURBOMACHINE

(71) Applicant: General Electric Company, Schenectady, NY (US)

(72) Inventors: Deepak Trivedi, Halfmoon, NY (US); Rahul Anil Bidkar, Clifton Park, NY (US); Bugra H. Ertas, Niskayuna, NY (US); Narendra Anand Hardikar, Bangalore (IN); Ravindra Shankar Ganiger, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/751,022

(22) Filed: Jun. 21, 2024

(65) Prior Publication Data

US 2024/0426222 A1 Dec. 26, 2024

(30) Foreign Application Priority Data

Jun. 23, 2023 (IN) ............................. 202311041857

(51) Int. Cl.

*F01D 11/02* (2006.01)
*F01D 11/00* (2006.01)
*F01D 25/04* (2006.01)

(52) U.S. Cl.

CPC .......... *F01D 11/025* (2013.01); *F01D 11/003* (2013.01); *F01D 25/04* (2013.01); *F05D 2260/96* (2013.01)

(58) Field of Classification Search

CPC ........ F01D 11/08; F01D 25/04; F01D 11/025; F01D 25/183; F01D 11/003; F05D 2260/96; F16J 15/3452; F16J 15/3464; F02C 7/28

See application file for complete search history.

(56) References Cited

U.S. PATENT DOCUMENTS 3,372,939 A * 3/1968 Coulombe ............... F16J 15/36
277/916
4,916,892 A 4/1990 Pope
(Continued)

FOREIGN PATENT DOCUMENTS

EP 2233700 A1 9/2010
WO WO 2017/180682 A1 10/2017

*Primary Examiner* — Eldon T Brockman

(74) *Attorney, Agent, or Firm* — Venable LLP; Andrew W. Bradshaw; Michele V. Frank

(57) ABSTRACT

This disclosure is directed to seal assemblies for a turbomachine. The seal assemblies include one or more paired rotors and stators and at least one interface between the rotors and the stators. The components of the stator may be axially and radially movable by vibrations and other mechanical interference. The stators comprise a sealing element, a seal housing, and a stator interface connected to the engine housing. In some examples, seal assembly includes a damping element to isolate one or more of the rotating components from vibrations mechanical interference that might misalign the rotating components from the stationary components while the turbomachine is operational. In some examples, the damping element is positioned between the seal housing and the stator interface. In other examples, the damping element is positioned between the stator interface and the engine housing.

19 Claims, 12 Drawing Sheets

(56) References Cited

U.S. PATENT DOCUMENTS

| | | | | |
|---|---|---|---|---|
| 6,311,983 | B1 * | 11/2001 | Burcham | F16J 15/44 415/113 |
| 6,601,854 | B2 * | 8/2003 | Auber | F16J 15/3464 277/377 |
| 6,676,369 | B2 | 1/2004 | Brauer | |
| 6,848,689 | B2 * | 2/2005 | Auber | F16J 15/3464 277/377 |
| 7,819,405 | B2 * | 10/2010 | Ohama | F16J 15/3404 277/390 |
| 8,490,980 | B2 | 7/2013 | Wright et al. | |
| 8,714,558 | B2 * | 5/2014 | Berard | F16J 15/363 277/377 |
| 9,903,218 | B2 | 2/2018 | Hafner et al. | |
| 11,028,927 | B2 | 6/2021 | Lewis | |
| 11,035,253 | B2 * | 6/2021 | Walker | F01D 11/005 |
| 11,047,481 | B2 | 6/2021 | Bidkar et al. | |
| 11,268,477 | B2 | 3/2022 | O'Leary | |
| 2013/0147123 | A1 * | 6/2013 | Davies | F01D 25/183 277/348 |
| 2014/0159317 | A1 * | 6/2014 | Jahn | F16J 15/3468 277/411 |
| 2015/0184531 | A1 * | 7/2015 | Baptista | F16J 15/24 415/230 |
| 2023/0279781 | A1 * | 9/2023 | Ganiger | F16J 15/4476 277/412 |

* cited by examiner

SEAL ASSEMBLY FOR A TURBOMACHINE

CROSS REFERENCE TO RELATED APPLICATION

This application claims the benefit of India Patent Application No. 202311041857, filed Jun. 23, 2023. The prior application is incorporated herein by reference in its entirety.

FIELD

The present disclosure relates to turbomachine engine seals, mechanisms for controlling turbomachine engine seal gaps, and dampers for seal gap control mechanisms.

BACKGROUND

Turbomachines typically include a rotor assembly, a compressor, and a turbine. The rotor assembly may include a fan having an array of fan blades extending radially outwardly from a rotating shaft. The rotating shaft, which transfers power and rotary motion from the turbine to both the compressor and the rotor assembly, is supported longitudinally using a plurality of bearing assemblies. Known bearing assemblies include one or more rolling elements supported within a paired race. To maintain a rotor critical speed margin, the rotor assembly is typically supported on three bearing assemblies: one thrust bearing assembly and two roller bearing assemblies. The thrust bearing assembly supports the rotor shaft and minimizes axial and radial movement thereof, while the roller bearing assemblies support radial movement of the rotor shaft.

Typically, these bearing assemblies are enclosed within a housing disposed radially around the bearing assembly. The housing forms a compartment or sump that holds a lubricant (e.g., oil) for lubricating the bearing. This lubricant may also lubricate gears and other seals. Gaps between the housing and the rotor shaft are necessary to permit rotation of the rotor shaft relative to the housing. The bearing sealing system usually includes two such gaps: one on the upstream end and another on the downstream end. In this respect, a seal disposed in each gap prevents the lubricant from escaping the compartment. Further, the air around the sump may generally be at a higher pressure than the sump to reduce the amount of lubricant that leaks from the sump. Further, one or more gaps and corresponding seals are generally positioned upstream and/or downstream of the sump to create the higher-pressure region surrounding the sump.

In some turbomachine engines, the seals may be hydrodynamic or non-contacting seals. To avoid wear of the components of such seals when the turbomachine engines are operational, it is important that no unintentional contact between adjacent components occurs. To accomplish this, various seal gap control mechanisms exist to maintain a desired spacing between non-contacting portions of a non-contacting seal.

DETAILED DESCRIPTION

Figure 1:
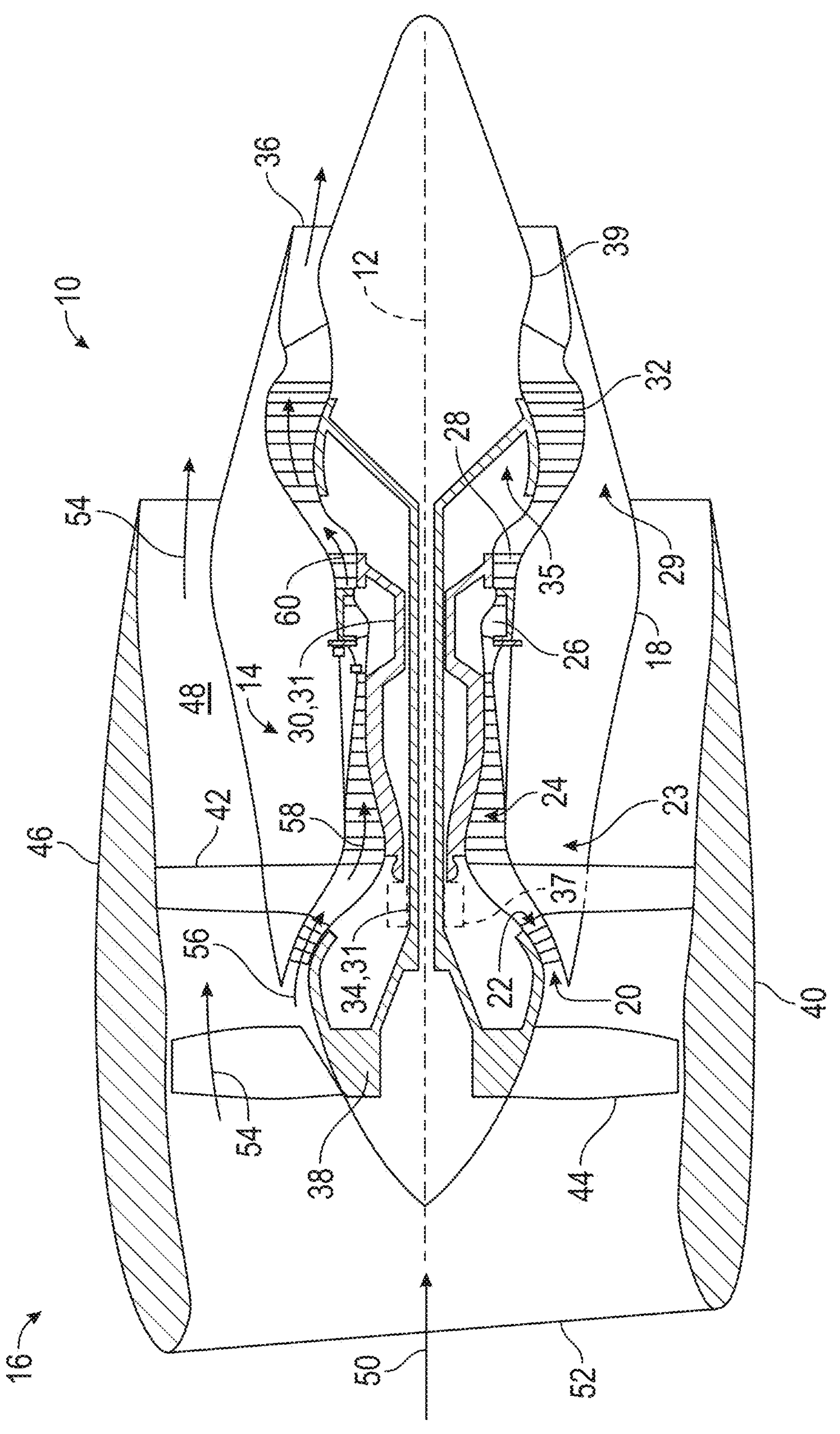
FIG. 1 illustrates a schematic side view of an example turbomachine engine.

Reference now will be made in detail to preferred embodiments, one or more examples of which are illustrated in the drawings. Each example is provided by way of explanation, not limitation of the preferred embodiments. In fact, it will be apparent to those skilled in the art that various modifications and variations can be made in the embodiments discussed without departing from the scope or spirit of disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Disclosed herein are examples of turbomachines and seal assemblies for use with turbomachines. The turbomachine may include a rotating shaft extending along a centerline axis and a fixed housing positioned exterior to the rotating shaft in a radial direction relative to the centerline axis. The seal assembly may include a sump housing at least partially defining a bearing compartment for holding a cooling lubricant. The seal assembly may further include a bearing supporting the rotating shaft. In addition, the seal assembly may also include a sump seal at least partially defining the bearing compartment. A pressurized housing of the seal assembly may be positioned exterior to the sump housing and define a pressurized compartment to at least partially enclose the sump housing. Further, a seal may be positioned between the rotating shaft and the pressurized housing to at least partially define the pressurized compartment to enclose the sump housing.

In certain examples, a seal assembly including a self-lubricating lattice material may allow for a more efficient turbomachine. A self-lubricating lattice material disposed between the rotating portions of a seal assembly and the static portions of the seal assembly can reduce the wear of the various seal assembly components that are in rotating contact with one another when the turbomachine is in an operational condition. Additionally, the use of a self-lubricating lattice material can mitigate heat buildup along the operational seal interface. In some examples, the self-lubricating lattice can be permeated with a lubricant and/or a coolant. For example, a self-lubricating lattice material can be deposited between a rotating runner and a static sealing element so as to form a lubricant layer between the runner and the sealing element when the turbomachine engine is operational.

It should be appreciated that, although the present subject matter will generally be described herein with reference to a gas turbine engine, the disclosed systems and methods may generally be used on bearings and/or seals within any suitable type of turbine engine, including aircraft-based turbine engines, land-based turbine engines, and/or steam turbine engines. Further, though the present subject matter is generally described in reference to a high-pressure spool of a turbine engine, it should also be appreciated that the disclosed system and method can be used on any spool within a turbine engine, (e.g., a low-pressure spool or an intermediate pressure spool).

Referring now to the drawings, FIG. 1 illustrates a cross-sectional view of one example of a turbomachine 10, also referred to herein as turbomachine engine 10. More particularly, FIG. 1 depicts the turbomachine 10 configured as a gas turbine engine that may be utilized within an aircraft in accordance with aspects of the present subject matter. The gas turbine engine is shown having a longitudinal or centerline axis 12, also referred to herein as a centerline, extending therethrough for reference purposes. In general, the engine may include a core engine 14 and a fan section 16 positioned upstream thereof. The core engine 14 may generally include a substantially tubular external housing 18 that defines an annular inlet 20. In addition, the external housing 18 may further enclose and support a compressor section 23. For the example shown, the compressor section 23 includes a booster compressor 22 and a high-pressure compressor 24. The booster compressor 22 generally increases the pressure of the air (indicated by arrow 54) that enters the core engine 14 to a first pressure level. The high-pressure compressor 24, such as a multi-stage, axial-flow compressor, may then receive the pressurized air (indicated by arrow 58) from the booster compressor 22 and further increases the pressure of such air. The pressurized air exiting the high-pressure compressor 24 may then flow to a combustor 26 within which fuel is injected into the flow of pressurized air, with the resulting mixture being combusted within the combustor 26.

For the example illustrated, the external housing 18 may further enclose and support a turbine section 29. Further, for the depicted example, the turbine section 29 includes a first, high-pressure turbine 28 and second, low-pressure turbine 32. For the illustrated examples, one or more of the compressors 22, 24 may be drivingly coupled to one or more of the turbines 28, 32 via a rotating shaft 31 extending along the centerline axis 12. For example, high energy combustion products 60 are directed from the combustor 26 along the hot gas path of the engine to the high-pressure turbine 28 for driving the high-pressure compressor 24 via a first, high-pressure drive shaft 30. Subsequently, the combustion products 60 may be directed to the low-pressure turbine 32 for driving the booster compressor 22 and fan section 16 via a second, low-pressure drive shaft 34 generally coaxial with high-pressure drive shaft 30. After driving each of turbines 28 and 32, the combustion products 60 may be expelled from the core engine 14 via an exhaust nozzle 36 to provide propulsive jet thrust. Further, the rotating shaft(s) 31 may be enclosed by a fixed housing 39 extending along the centerline axis 12 and positioned exterior to the rotating shaft 31 in a radial direction relative to the centerline axis 12.

Additionally, as shown in FIG. 1, the fan section 16 of the engine may generally include a rotatable, axial-flow fan rotor assembly 38 surrounded by an annular fan casing 40. It should be appreciated by those of ordinary skill in the art that the fan casing 40 may be supported relative to the core engine 14 by a plurality of substantially radially-extending, circumferentially-spaced outlet guide vanes 42. As such, the fan casing 40 may enclose the fan rotor assembly 38 and its corresponding fan blades 44. Moreover, a downstream section 46 of the fan casing 40 may extend over an outer portion of the core engine 14 so as to define a secondary, or bypass, airflow conduit 48 providing additional propulsive jet thrust.

It should be appreciated that, in several examples, the low-pressure drive shaft 34 may be directly coupled to the fan rotor assembly 38 to provide a direct-drive configuration. Alternatively, the low-pressure drive shaft 34 may be coupled to the fan rotor assembly 38 via a speed reduction device 37 (e.g., a reduction gear or gearbox or a transmission) to provide an indirect-drive or geared drive configuration. Such a speed reduction device(s) 37 may also be provided between any other suitable shafts and/or spools within the turbomachine engine 10 as desired or required.

During operation of the turbomachine engine 10, it should be appreciated that an initial airflow (indicated in FIG. 1 by arrow 50) may enter the turbomachine engine 10 through an associated inlet 52 of the fan casing 40. For the illustrated example, the airflow then passes through the fan blades 44 and splits into a first compressed airflow (indicated by arrow 54) that moves through the bypass airflow conduit 48 and a second compressed airflow (indicated by arrow 56) which enters the booster compressor 22. In the depicted example, the pressure of the second compressed airflow 56 is then increased and enters the high-pressure compressor 24 (as indicated by arrow 58). After mixing with fuel and being combusted within the combustor 26, the combustion products 60 may exit the combustor 26 and flow through the high-pressure turbine 28. Thereafter, for the shown example, the combustion products 60 flow through the low-pressure turbine 32 and exit the exhaust nozzle 36 to provide thrust for the engine.

Figure 2:
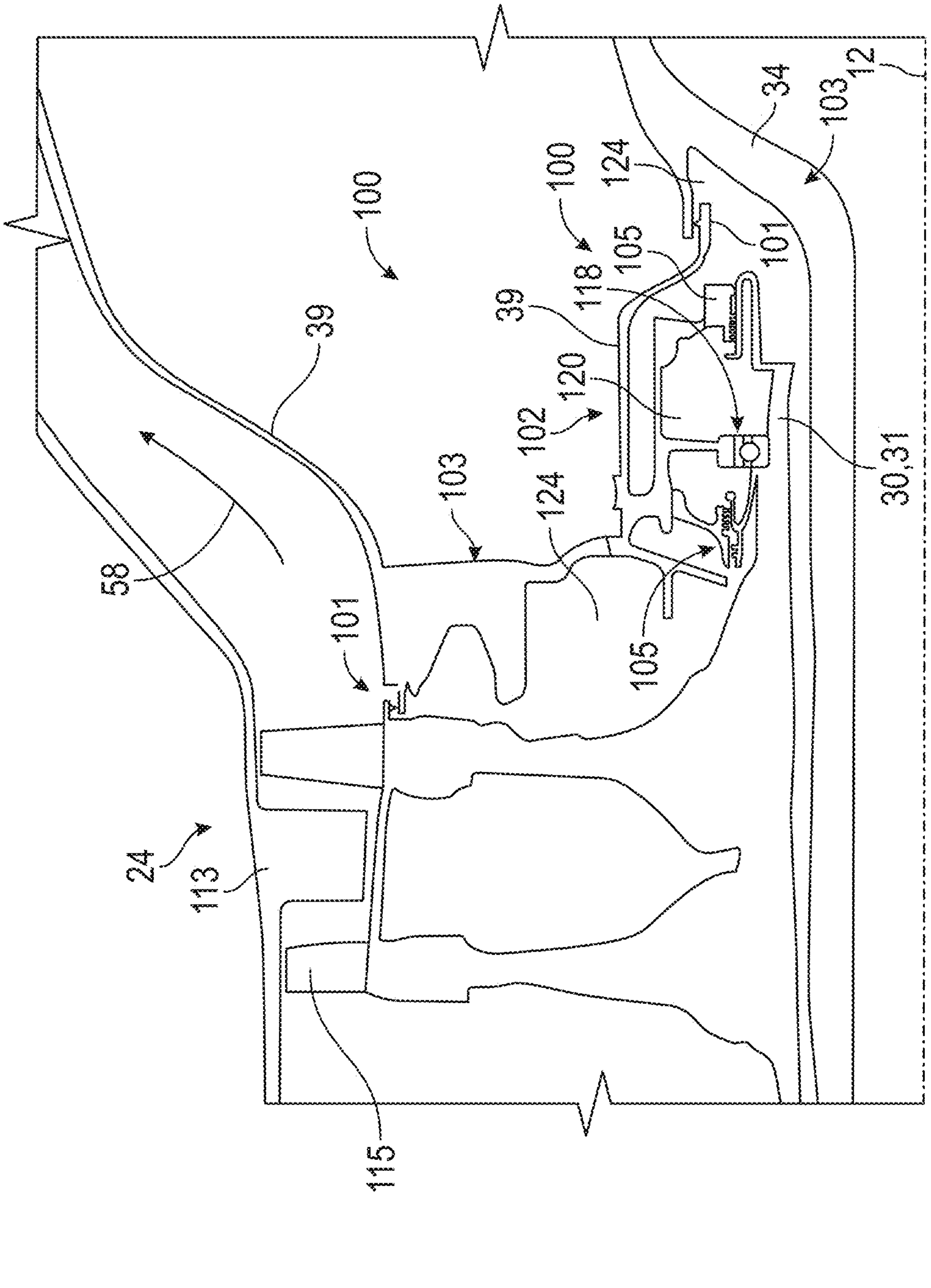
FIG. 2 illustrates a schematic side view of a section of a turbomachine engine including an example of a seal assembly.

Turning now to FIG. 2, the turbomachine engine 10 (FIG. 1) can include a seal assembly 100, positioned between stationary and rotating components of the turbomachine engine 10. For example, the seal assembly 100 can be positioned between the stationary and rotating components of the high-pressure compressor 24 (FIG. 1) described above.

The seal assembly 100 may generally isolate a sump housing 102 from the rest of the turbomachine engine 10. As such, the seal assembly 100 includes the sump housing 102. The sump housing 102 includes at least a portion of the rotating shaft 31 and the fixed housing 39. For example, the fixed housing 39 may include various intermediary components or parts extending from the fixed housing 39 to form a portion of the sump housing 102. Such intermediary components or parts may be coupled to the fixed housing 39 or formed integrally with the fixed housing 39. Similarly, the rotating shaft 31 may also include various intermediary components extending from the rotating shaft 31 to form the sump housing 102. Further, the sump housing 102 at least partially defines a compartment, more particularly, a bearing compartment 120 for holding a cooling lubricant (not shown). For instance, the sump housing 102 at least partially radially encloses the cooling lubricant and a bearing 118 (as described in more detail in relation to FIG. 3A). The cooling lubricant (e.g., oil) for lubricating the various components of the bearing 118 may circulate through the bearing compartment 120. The seal assembly 100 may include one or more sump seals 105 (as described in more detail in reference to FIGS. 3 and 4) at least partially defining the bearing compartment 120 for holding the cooling lubricant.

The seal assembly 100 further includes a pressurized housing 103 positioned exterior to the sump housing 102. The pressurized housing 103 may at least partially enclose the sump housing 102. For example, as illustrated, the pressurized housing 103 may be positioned both forward and aft relative to the centerline axis 12 of the turbomachine engine 10. The pressurized housing 103 may include at least a portion of the rotating shaft 31 and the fixed housing 39 or intermediary components extending from the rotating shaft 31 and/or the fixed housing 39. For example, the pressurized housing 103 may be formed at least partially by the high-pressure drive shaft 30 and the fixed housing 39 both forward and aft of the sump housing 102.

For the depicted example, the pressurized housing 103 defines a compartment, and more particularly, a pressurized compartment 124 to at least partially enclose the sump housing 102. In the exemplary example, bleed air from the compressor section 23 (FIG. 1), the turbine section 29 (FIG. 1), and/or the fan section 16 (FIG. 1) may pressurize the pressurized compartment 124 to a pressure relatively greater than the pressure of the bearing compartment 120. As such, the pressurized compartment 124 may prevent or reduce the amount of any cooling lubricant leaking from the sump housing 102 across the sump seal 105.

Further, the seal assembly 100 may include one or more seals to further partially define the pressurized compartment 124 (such as the seal assemblies 200 and 300 as described in more detail in regard to FIGS. 4-10). For instance, one or more sealing elements may be positioned between the rotating shaft 31 and the fixed housing 39.

Figure 3A:
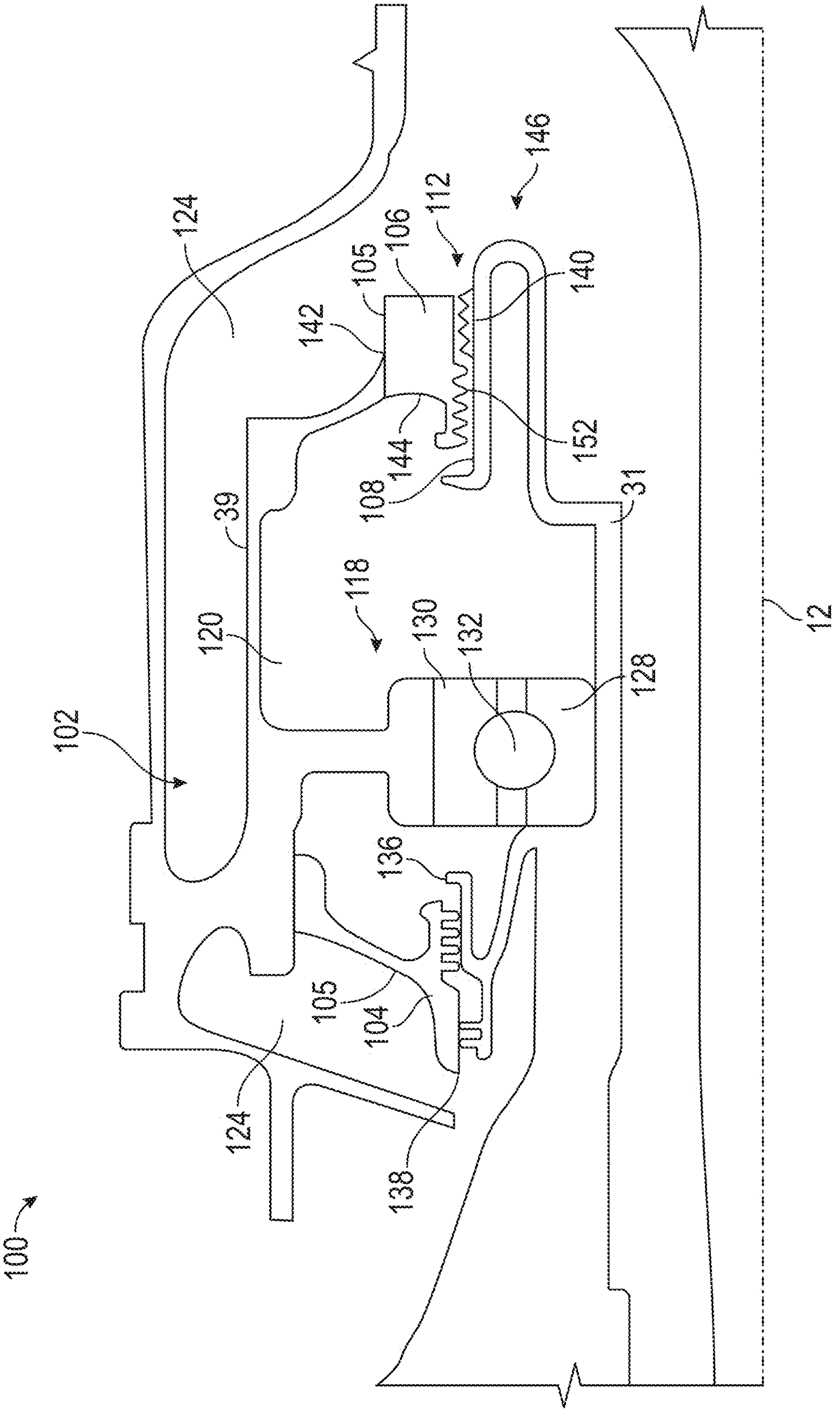
FIG. 3A illustrates an enlarged view of the seal assembly depicted in FIG. 2.

Referring now to FIG. 3A, a closer view of the sump housing 102 is illustrated according to aspects of the present disclosure. In the illustrated example, the seal assembly 100 includes the bearing 118. The bearing 118 may be in contact with an exterior surface of the rotating shaft 31 and an interior surface of the fixed housing 39. It should be recognized that the rotating shaft 31 may be the high-pressure drive shaft 30 or the low-pressure drive shaft 34 described in regard to FIG. 1 or any other rotating drive shaft of the turbomachine 10. The bearing 118 may be positioned radially between the portion of the rotating shaft 31 and the portion of the fixed housing 39 that form the sump housing 102. As such, the bearing 118 may be positioned within the sump housing 102. The bearing 118 may support the rotating shaft 31 relative to various fixed components in the engine.

In the depicted example, the bearing 118 may be a thrust bearing. That is, the bearing 118 may support the rotating shaft 31 from loads in the axial, or the axial and radial directions relative to the centerline axis 12. For example, the bearing 118 may include an inner race 128 extending circumferentially around an outer surface of the rotating shaft 31. In the shown example, an outer race 130 is disposed radially outward from the inner race 128 and mates with the fixed housing 39, such as an interior surface of the sump housing 102. The inner and outer races 128, 130 may have a split race configuration. For the depicted example, the inner and outer race 128, 130 may sandwich at least one ball bearing 132 therebetween. Preferably, the inner and outer races 128, 130 sandwich at least three ball bearings 132 therebetween.

In additional examples, the bearing 118 may be a radial bearing. That is, the bearing 118 may support the rotating shaft 31 from loads generally in the radial direction relative to the centerline axis 12. In other examples, the inner race 128 and outer race 130 may sandwich at least one cylinder, cone, or other shaped element to form the bearing 118.

Still referring to FIG. 3A, the seal assembly may include two sump seals 105. Each of a first and a second sump seals 105 may be positioned between the rotating shaft 31 and the fixed housing 39 to at least partially define the bearing compartment 120 for housing the cooling lubricant and the bearing 118. For example, the first sump seal 105 may be positioned forward of the bearing 118, and the second sump seal 105 may be positioned aft of the bearing 118. For the illustrated example, the first sump seal 105 may be a labyrinth seal 104, and the second sump seal 105 may be a carbon seal 106. Although, the two sump seals 105 may be any suitable type of seal, and, in other examples, the sealing system may include further sump seals 105, such as three or more. For example, in other examples, multiple labyrinth seals, carbon seals, and/or hydrodynamic seals may be utilized in the sump housing 102 in any arrangement.

FIG. 3A also more closely illustrates the labyrinth seal 104 and the carbon seal 106. For the example depicted, the labyrinth seal 104 and the carbon seal 106 (such as a hydrodynamic seal) are non-contact seals, which do not require contact between the stationary and moving components when operating at high speed. Non-contact seals typically have a longer service life than contact seals. Still, in other examples, one or both of the sump seals 105 may be a contact seal. Each type of seal may operate in a different manner. For the depicted example, the labyrinth seal 104 includes an inner surface 136 (coupled to the rotating shaft 31) and an outer surface 138 (coupled to the fixed housing 39). For example, a tortuous path (not shown) extending between the inner surface 136 and the outer surface 138 prevents the cooling lubricant from escaping the sump housing 102. For the exemplary example shown, the air pressure on an outer side of the labyrinth seal 104 (i.e., in the pressurized compartment 124) is greater than the air pressure on the inner side of the labyrinth seal 104 (i.e., in the bearing compartment 120). In this respect, the stationary and rotating components may be separated by an air film (sometimes called an air gap) during relative rotation therebetween.

The carbon seal 106 may, in some examples, be a hydrodynamic or non-contacting seal with one or more hydrodynamic grooves 140 that are positioned between the stationary and rotating components, as illustrated in FIG. 3A. In general, the hydrodynamic grooves 140 may act as a pump to create an air film between the non-contacting carbon seal 106 and the rotating shaft 31. For example, as the rotating shaft 31 rotates, fluid shear may direct air in a radial gap 112 into the hydrodynamic groove(s) 140. As air is directed into the hydrodynamic grooves 140, the air may be compressed until it exits the hydrodynamic groove(s) 140 and forms the air film to separate the rotating shaft 31 and the non-contacting carbon seal 106. The air film may define a radial gap 112 between the stationary and non-stationary components of the seal assembly 100, as shown in FIG. 3A. Thus, the rotating shaft 31 may ride on the air film instead of contacting an inner sealing surface 108.

In some examples, the carbon seal 106 is proximate to and in sealing engagement with a hairpin member 146 of the rotating shaft 31. In this respect, the hairpin member 146 may contact the carbon seal 106 when the rotating shaft 31 is stationary or rotating at low speeds. Though it should be recognized that the carbon seal 106 may be in sealing engagement with any other part or component of the rotating shaft 31. Nevertheless, for the illustrated hydrodynamic, carbon seal 106, the carbon seal 106 lifts off of the rotating shaft 31 and/or the hairpin member 146 when the rotating shaft 31 rotates at sufficient speeds.

Figure 3B:
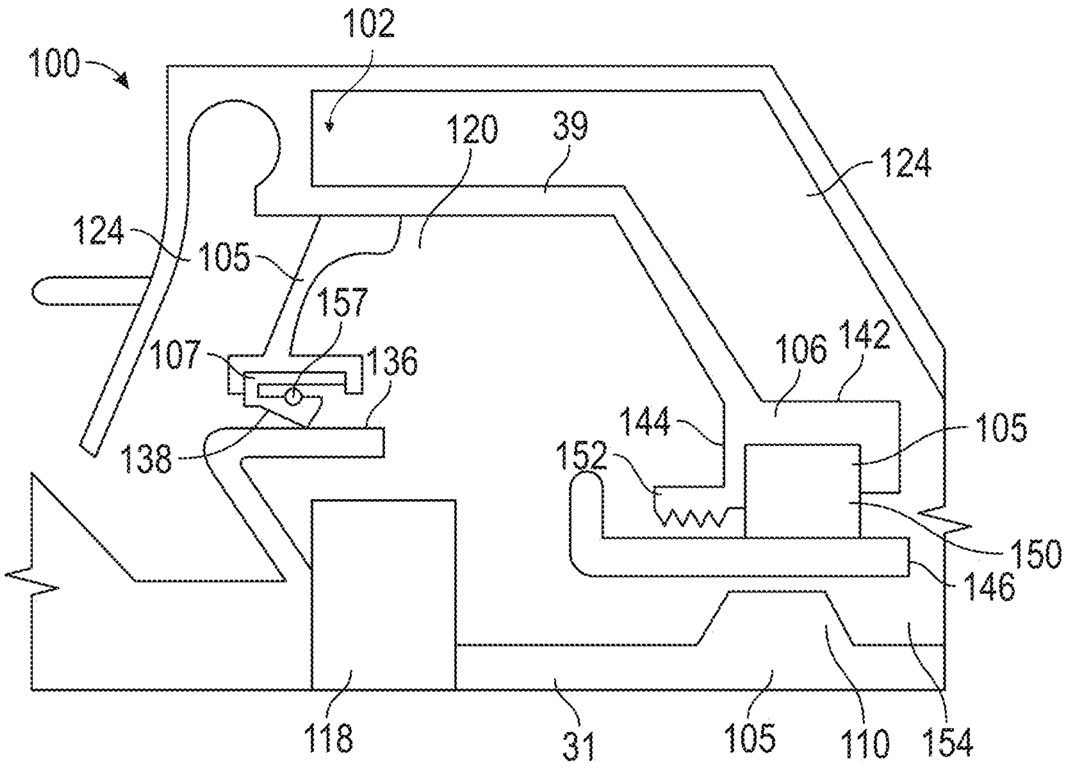
FIG. 3B illustrates a schematic side view of a section of a turbomachine engine including a contact seal assembly.

Referring now to FIG. 3B, a sump housing 102 of a seal assembly 100 is illustrated according to another aspect of the present disclosure. It should be noted that the description of the seal assembly 100 of FIG. 3A applies to like parts of the seal assembly 100 of FIG. 3B unless otherwise noted, and accordingly, like parts will be identified with like numerals.

The sump housing 102 of FIG. 3B particularly illustrates the sump housing 102 with three sump seals 105. The sump housing 102 may generally be configured as the sump housing 102 of FIG. 3A. For example, the sump housing 102 may include a portion of the rotating shaft 31, a portion of the fixed housing 39, and enclose the bearing 118. Further, the sump seals 105 and the sump housing 102, at least partially, define the bearing compartment 120.

In the example illustrated, one of the sump seals 105 is a contacting lip seal 107. As such, the inner surface 136 and the outer surface 138 may be in contact in order to seal the sump housing 102. The illustrated example further includes a carbon seal 106 configured as a contacting carbon seal. As such, the carbon seal 106 includes a carbon element 150 in sealing engagement with the rotating shaft 31. For the example depicted, the carbon element 150 may engage the hairpin member 146 of the rotating shaft 31. Additionally, the carbon seal 106 may include a windback 152 that reduces the amount of the cooling lubricant that reaches the carbon element 150. Further, one of the sump seals 105 may be an open gap seal 110. For instance, the pressure on an outer side 154 (such as the pressurized compartment 124) may be greater than the pressure of the bearing compartment 120 and thus reduce the leakage of cooling lubricant through the open gap seal 110. In further examples, one of the sump seals 105 may be a brush seal. In such examples, the brush seal may contain a plurality of bristles (such as carbon bristles) in sealing engagement between the rotating shaft 31 and the fixed housing 39.

Another example seal assembly 200 that may be used with the turbomachine engine 10 discussed above is illustrated in FIG. 4. It should be noted that the description of the seal assembly 100 of FIGS. 2, 3A, and 3B applies to like parts of the seal assembly 200 of FIG. 4 unless otherwise noted; and accordingly, like parts will be identified with like numerals.

Figure 4:
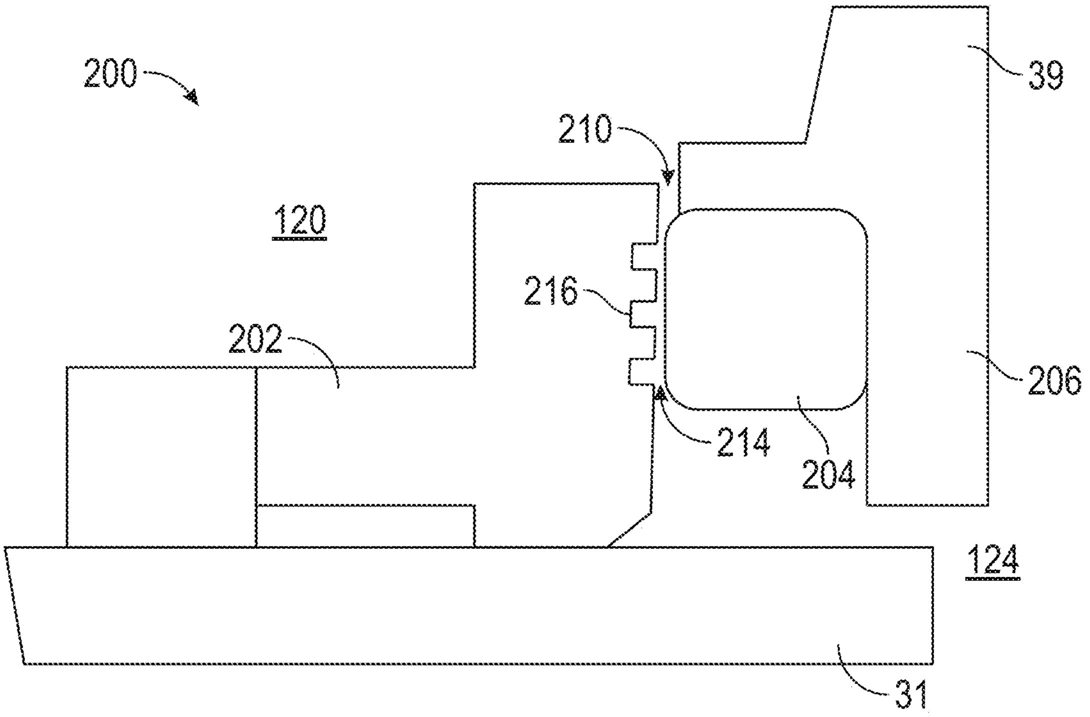
FIG. 4 illustrates a hydrodynamic seal assembly according to one example.

As shown in FIG. 4, the seal assembly 200 can be a face seal positioned between the components of the rotating shaft 31 and the components of the fixed housing 39 and can comprise a runner 202 disposed circumferentially around and coupled to the rotating shaft 31, such that the runner 202 and the rotating shaft rotate in tandem. The seal assembly 200 can also comprise a sealing element 204 coupled to a stationary member 206 of the fixed housing 39.

During the operation of a turbomachine engine 10 that includes the seal assembly 200, the rotation of the shaft 31 causes the corresponding rotation of the runner 202 connected to the rotating shaft 31. The runner 202 contacts the sealing element 204 along an interfacial zone 210. The interfacial zone 210 can, in some examples, form a boundary between two chambers, such as the bearing compartment 120 and the pressurized compartment 124 described above, and illustrated in FIG. 3A. Accordingly, the interfacial zone 210 can, in some examples, prevent the flow of fluids between the two chambers.

In some examples, such as that illustrated in FIG. 4 the seal assembly 200 can be a hydrodynamic seal. In such examples, the sealing element 204 and/or the runner 202 can have hydrodynamic features such as hydrodynamic grooves 216. The hydrodynamic grooves 216 function in substantially the same way as the hydrodynamic grooves in non-contacting carbon seal 106 described above to create an air cushion between the runner 202 and the sealing element 204. As the rotating shaft 31 and the connected runner 202 rotate relative to the sealing element 204 and the fixed housing 39, the air cushion prevents the sealing element 204 and the runner 202 from coming into contact, while preventing the flow of fluids such as lubricant between the two chambers separated by the seal, such as the bearing compartment 120 and the pressurized compartment 124. It is to be understood that, in other examples, the seal assembly 200 can comprise a contact seal (such as those discussed above), wherein the interfacial zone 210 is defined by a region of contact between the sealing element 204 and the runner 202.

In some examples, the facial seal assemblies, such as that illustrated in FIG. 4, can include sealing elements (such as sealing element 204 as previously discussed) coupled to the fixed housing 39 by a gap controlling mechanism (such as a damper or spring disposed between the sealing element 204 and the fixed housing 39). In such examples, the position of the sealing element relative to the runner can be adjusted during the operation of the turbomachine engine 10, according to forces imparted by other components of the seal assembly, or external engine conditions such as physical shocks and/or turbulence. However, in some cases, the positioning of the components of the seal assembly, and particularly the sealing element may be too sensitive to rapid variations in the forces and/or operational conditions affecting the turbomachine engine 10. This can cause axial misplacement of the sealing element, which may result in undesirable contact between the sealing element and the runner, or abrasion of the sealing element and/or the runner. The sealing element can also become radially misaligned with the runner (i.e., the center of gravity of the sealing element can come out of radial alignment with the center of gravity of the runner). When the sealing element becomes radially misaligned, the forces controlling the gap between the sealing element and the runner can also come out of alignment, which cause a reduction in the effectiveness of the seal and/or can cause the sealing element to impinge on the runner.

Accordingly, there is a need for seal assemblies with improved damping for the sealing element, capable of reducing and/or dampening the movement of the sealing element relative to the runner and/or relative to the fixed housing 39 in response to changes in operational and/or environmental conditions of the turbomachine engine 10.

In some examples, the movement of the sealing element relative to the runner can be dampened by isolation or dampening the portions of the seal assembly, sometimes called the stator, extending between the sealing element and the fixed housing 39.

Figure 5C:
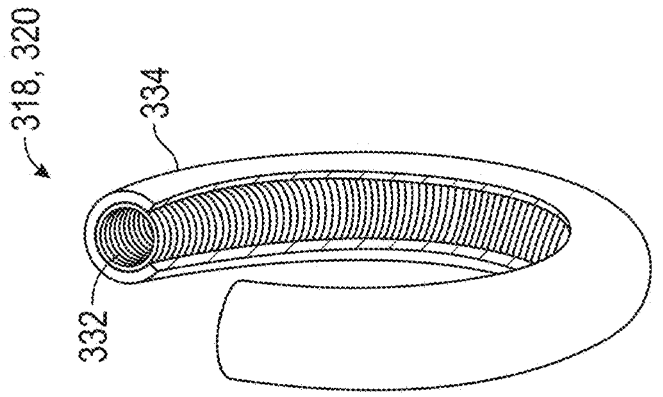
FIG. 5C illustrates a coil portion of the vibration damper of FIG. 5A according to one example.
Figure 5B:
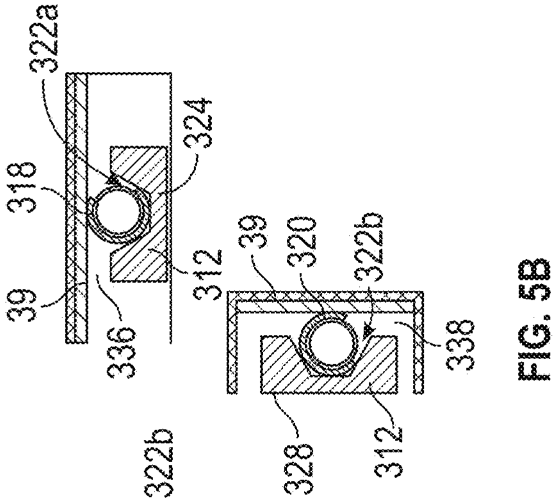
FIG. 5B illustrates the vibration damper of FIG. 5A disposed between the stator interface and the seal assembly in greater detail.
Figure 5A:
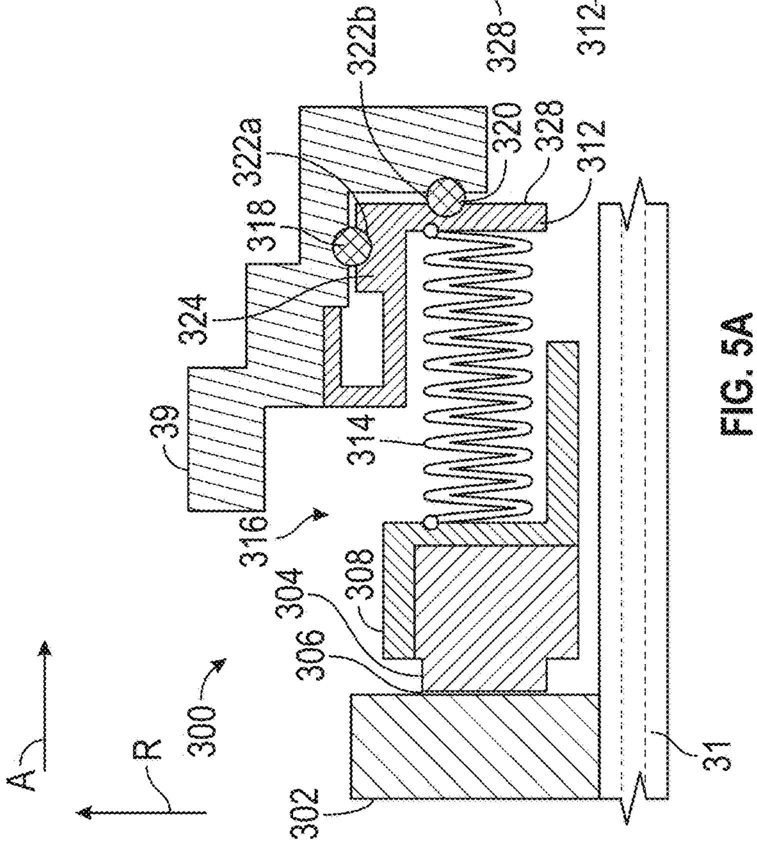
FIG. 5A illustrates a seal assembly according to another example, having a vibration damper disposed between a stator interface and a fixed housing.
Figure 7:
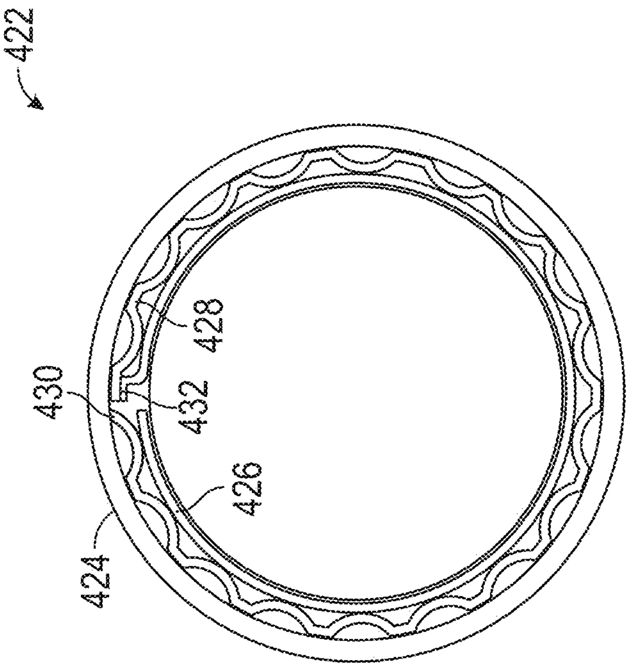
FIG. 7 illustrates the vibration damper of FIG. 6 in greater detail.

FIG. 5A shows an example seal assembly 300, suitable for use with turbomachine engines previously discussed (such as turbomachine engine 10), with additional damping elements to control the axial "A" and radial "R" position of various components of the seal assembly 300. As shown in FIG. 5A, the seal assembly 300 can comprise a runner 302 statically coupled to the rotating shaft 31 and a sealing element 304 axially spaced apart from to the runner 302 and movably coupled to the fixed housing 39. The region of contact between the runner 302 and the sealing element 304 (or in the case of a hydrodynamic seal, the gap between the runner 302 and the sealing element 304) can define a seal interface 306.

With continued reference to FIG. 5A, the sealing element 304 can be statically coupled to a seal housing 308. The seal assembly 300 can also include a spring chamber 310 defined by the seal housing 308 and a stator interface 312, which in turn is statically coupled to a fixed housing 39. A spring element 314 can be disposed in the spring chamber 310 and configured to allow the seal housing 308 and the stator interface 312 to move axially relative to one another. Thus, the seal housing is movably connected to the fixed housing, through the spring element. In turn, this allows the contact force (in the case of a contact seal assembly) or the seal gap (in the case of a non-contacting seal assembly) between the runner 302 and the sealing element 304 to be adjusted during the operation of the turbomachine engine 10. For convenience, the portion of the seal assembly 300 comprising the sealing element 304, the seal housing 308, the spring chamber 310, the spring element 314, and the stator interface 312 can be collectively referred to as a stator assembly 316.

The seal assembly 300 can also include a radial damper 318 and an axial damper 320 disposed between and in mutual contact with the stator interface 312 and the fixed housing 39. As best shown in FIG. 5B, the radial damper 318 can be disposed in a first notch 322*a* formed in a radial face 324 of the stator interface 312, such that the radial damper 318 extends around the circumference of the stator interface 312 and is positioned in a radial gap 336 positioned between the stator interface 312 and a portion of the fixed housing 39. Similarly, as best shown in FIG. 5B, the axial damper 320 can be disposed in a second notch 322*b*, formed in an axial face 328 of the stator interface 312, such that the axial damper 320 extends circumferentially around the rotating shaft 31 and is positioned in an axial gap 338 located between the stator interface 312 and a portion of the fixed housing 39.

The radial damper 318 and the axial damper 320 are illustrated in greater detail in FIG. 5C. As shown in FIG. 5C, the dampers 318, 320 can each have an annular body comprising an inner coil 332 and an outer sheath 334 disposed outside of and extending at least partially around the inner coil 332.

In some examples, the inner coil 332 can comprise a plurality of deformable rings, and the outer sheath 334 can comprise a flexible material such as an elastomer, a ceramic or glass-fiber rope, or a metallic structure. The arrangement of the outer sheath 334 and the inner coil 332 can be such that the inner coil 332 can deform within the outer sheath 334, while the outer sheath 334 remains in contact with both the stator interface 312 and the fixed housing 39. In this way, forces that might otherwise be communicated between the fixed housing 39 and the stator interface 312 are absorbed or mitigated by the dampers 318, 320.

In a neutral or equilibrium condition, the center of gravity of the stator assembly 316 can be axially aligned with the center of gravity of the runner 302 (that is, both centers of gravity can lie on the centerline axis 12 of the turbomachine engine 10). However, during the operation of the turbomachine engine 10, forces exerted on the sealing element 304 can cause the displacement of the stator assembly 316 such that the center of gravity of the stator assembly 316 comes out of axial alignment with the center of gravity of the runner 302 (i.e., moves off the centerline axis 12 of the turbomachine engine 10).

More particularly, and with reference back to FIG. 5A, in the case of a non-contacting seal assembly, the hydrodynamic pressures caused by the air film along the seal interface 306 can exert an axial force on the sealing element 304, directed towards the stator interface 312. In the case of a contacting seal assembly, the contact between the sealing element 304 and the runner 302 can exert an axial force on the sealing element 304 directed towards the stator interface 312. In both cases, external forces on the turbomachine engine 10, such as operational vibrations, external physical shocks, and turbulence can displace the sealing element 304, the seal housing 308, and the stator interface 312.

Such displacement of the sealing element 304 and the seal housing 308 can comprise both an axial component and a radial component. In the case of radial displacement of the stator interface 312, the stator interface 312 can move relative to the fixed housing 39, such that the stator interface 312 moves closer to the fixed housing 39 at some points along the circumference of the radial gap 336 and further away from the fixed housing 39 at others. As the stator interface 312 moves relative to the fixed housing 39, the radial damper 318 can deform to absorb and/or resist the forces which would tend to move the stator interface 312, and therefore the seal housing 308 and the sealing element 304, out of radial alignment with the runner 302.

In the case of axial displacement of the stator interface 312, the stator interface 312 can move axially to the fixed housing 39, such that the stator interface 312 moves closer to or further apart from the fixed housing 39 at some points along the circumference of the axial gap 338 and further away from the fixed housing 39 at others. As the stator interface 312 moves relative to the fixed housing 39, the axial damper 320 can deform to absorb and/or resist the forces which would tend to move the stator interface 312, and therefore the seal housing 308 and the sealing element 304, out of axial alignment with the runner 302.

Additionally, the radial damper 318 and the axial damper 320 isolate the stator interface 312, the seal housing 308, and the sealing element 304 from the fixed housing 39. In this way, vibrations in the fixed housing 39, such as those caused by the rotational motion of the various rotating components of the turbomachine engine 10, can be reduced and/or slowed by the radial damper 318 and the axial damper 320. Because the radial damper 318 and the axial damper 320 are flexible and configured to absorb forces communicated between the stator interface 312 and the fixed housing 39, the position of the components of the seal assembly 300 relative to one another may be maintained despite operational vibrations of the turbomachine engine 10 (FIG. 1).

In another example, the seal assembly 300 can include a stator comprising a radial foil damper configured to absorb radial and axial displacement of the stator components. This stator can be included in lieu of the stator assembly 316 described above in relation to the seal assembly 300 and illustrated in FIGS. 5A-5C.

Figure 6:
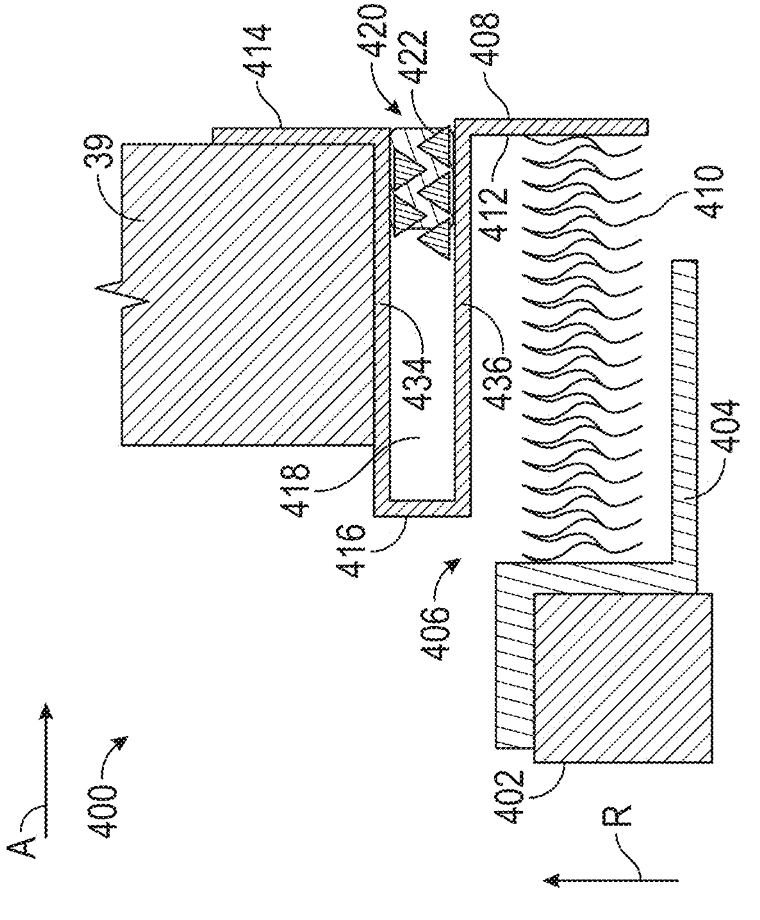
FIG. 6 illustrates a stator of a seal assembly having a vibration damper according to another example.

Turning now to FIG. 6, a stator assembly 400 according to another example can comprise a sealing element 402 statically coupled to a seal housing 404. The stator assembly 400 also comprises a spring chamber 406 defined by the seal housing 404 and a stator interface 408, which in turn is statically coupled to a fixed housing 39. A spring element 410 can be disposed in the spring chamber 406 and configured to allow the seal housing 404 and the stator interface 408 to move axially relative to one another, which in turn allows the contact force (in the case of a contact seal assembly) or the seal gap (in the case of a non-contacting seal assembly) between a runner (such as the runner 302 of FIG. 5A) and the sealing element 402 to be adjusted during the operation of the turbomachine engine 10.

The stator interface 408 can, as shown in FIG. 6, comprise a first axial face portion 412 and a second axial face portion 414 separated by a loop member 416. The first axial face portion 412 can form one axial face of the spring chamber 406, receiving a first end portion 410*a* of the spring element 410. The second axial face portion 414 can be coupled to the fixed housing 39. The loop member 416 extending between the first axial face portion 412 and the second axial face portion 414 can define an annular gap 418 between the axial face portions 412, 414. As shown in FIG. 6, the stator interface 408 can thus have a horseshoe shaped or substantially horseshoe shaped cross section, with the first axial face portion 412 on one end of the horseshoe shape and the second axial face portion 414 on the other end of the horseshoe shape.

The stator interface 408 can, in such examples, be formed of a relatively thin material, and subject to vibrational forces and turbulence when the turbomachine engine 10 (FIG. 1) is in an operational state. As the stator assembly 400 is subjected to axial and/or radial displacement, as described in greater detail above, either from the forces generated in the sealing gap (i.e., hydrodynamic forces in the case of a hydrodynamic seal assembly, or contact forces in the case of a contact seal assembly), the first axial face portion 412 and the second axial face portion 414, and thus the stator assembly 400 and the fixed housing 39, can move relative to one another.

More particularly, when an axial force moves the sealing element 402 and/or the seal housing 404, such as might occur from fluctuations in forces in the seal gap, as described above in an axial direction, the stator interface 408 can deflect with the first axial face portion 412 moving axially relative to the second axial face portion 414. Likewise, when an axial force, such as from turbulent flight conditions, acts on the fixed housing 39, the second axial face portion 414 can move relative to the first axial face portion 412.

Similarly, when a radial force moves the sealing element 402 and/or the seal housing 404, the first axial face portion 412 of the stator interface 408 can move radially closer to or further apart from the second axial face portion 414, by narrowing or widening a mouth 420 of the annular gap 418. Likewise, radial force to the fixed housing 39 can cause the second axial face portion 414 to move relative to the first axial face portion 412 in the same way.

To reduce and/or absorb the relative movement of the axial face portions 412, 414, and thus maintain alignment in the radial "R" direction and the axial "A" direction of the seal assembly, the stator assembly 400 can also include a radial foil damper 422. Shown in greater detail in FIG. 7, the radial foil damper 422 can comprise an outer sheath 424 and an inner sheath 426. A corrugated foil 428 can be disposed between the outer sheath 424 and the inner sheath 426 of the radial foil damper 422. The corrugated foil 428 can attach at a first end portion 430 to the outer sheath 424 and at a second end portion 432 to the inner sheath 426. The radial foil damper 422 can be configured such that the outer sheath 424 and the inner sheath 426 of the radial foil damper 422 can be configured to move axially relative to one another. As the outer sheath 424 and the inner sheath 426 of the radial foil damper 422 move axially relative to each other, the first end portion 430 of the corrugated foil 428 can move along with the outer sheath 424 and the second end portion 432 of the corrugated foil 428 can move along with the inner sheath 426 of the foil damper. The corrugated foil 428 elastically deforms or axially moves to accommodate the relative axial motion of the outer sheath 424 and the inner sheath 426, and the force required to cause this elastic deformation or axial motion of the corrugated foil 428 resists the forces moving the outer sheath 424 and the inner sheath 426.

As shown in FIG. 6, the radial foil damper 422 can be positioned between the first axial face portion 412 and the second axial face portion 414 of the stator interface 408. Thus, the outer sheath 424 will be in contact in contact with a radially outer portion 434 of the loop member 416 and the inner sheath 426 in contact with a radially inner portion 436 of the loop member 416.

When the first axial face portion 412 and the second axial face portion 414 move axially relative to one another in response to forces on the fixed housing 39 and/or the sealing element 402, the radially outer portion 434 and the radially inner portion 436 of the loop member 416 also move axially relative to each other. This causes the outer sheath 424 to move with the radially outer portion 434 of the loop member 416 and the inner sheath 426 to move with the radially inner portion 436 of the loop member 416. In turn, this causes the radial foil damper 422 to absorb axial forces acting on the first axial face portion 412 and the second axial face portion 414 of the stator interface 408.

When the first axial face portion 412 and the second axial face portion 414 move radially relative to one another in response to forces on the fixed housing 39 and/or the sealing element 402, the radially outer portion 434 and the radially inner portion 436 of the loop member 416 move closer together or further apart. This causes the outer sheath 424 and the inner sheath 426 of the radial foil damper 422 press closer together or pull further apart, which elastically deforms the corrugated foil 428, absorbing radial forces and/or displacement acting on the stator interface 408.

In another example, a seal assembly can include a stator comprising an axial foil damper configured to absorb radial and axial displacement of the stator components. This stator can be included in lieu of the stator assembly 316 (FIG. 5A) or the stator assembly 400 (FIG. 6) described above.

Figure 8C:
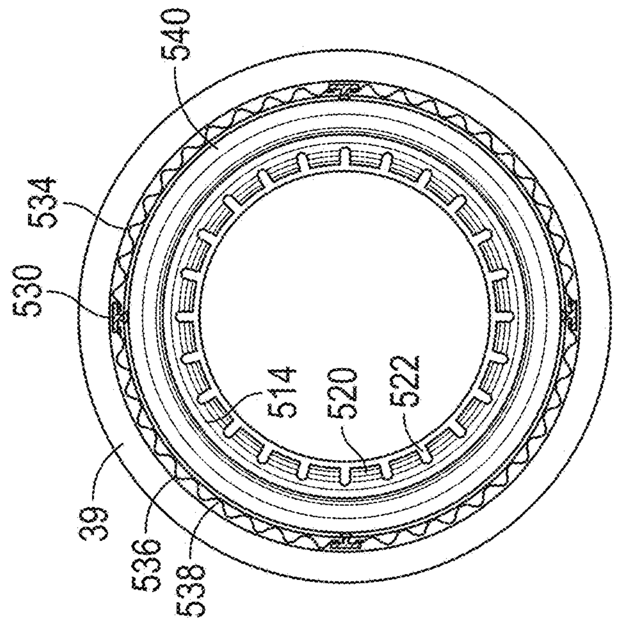
FIG. 8C illustrates the vibration damper of the seal assembly of FIG. 8A in greater detail.
Figure 8B:
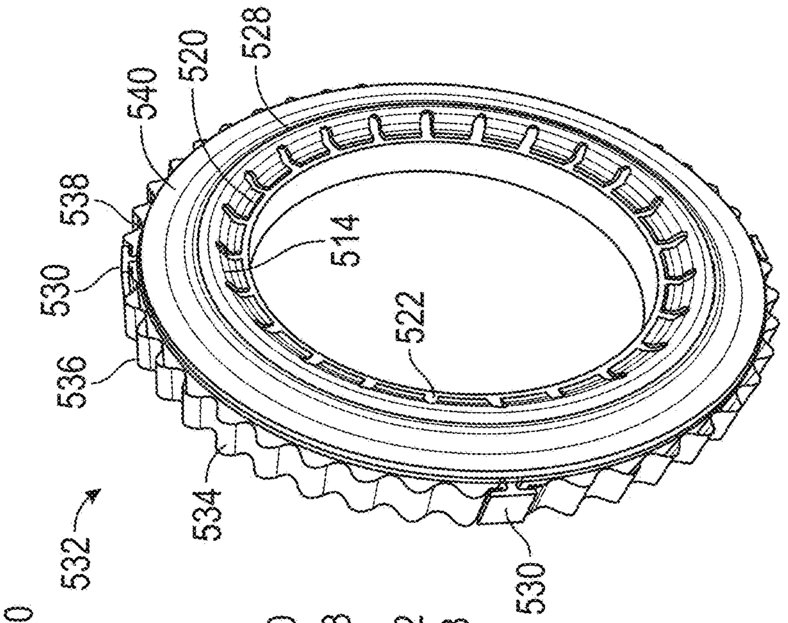
FIG. 8B illustrates the vibration damper of the seal assembly of FIG. 8A in greater detail.
Figure 8A:
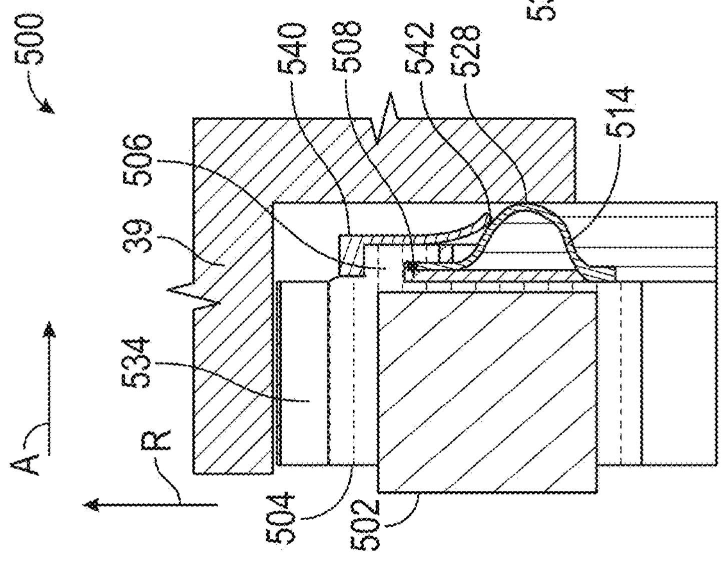
FIG. 8A illustrates a portion of a seal assembly according to another example, having a vibration damper disposed between a stator interface and a fixed housing.
Figure 8E:
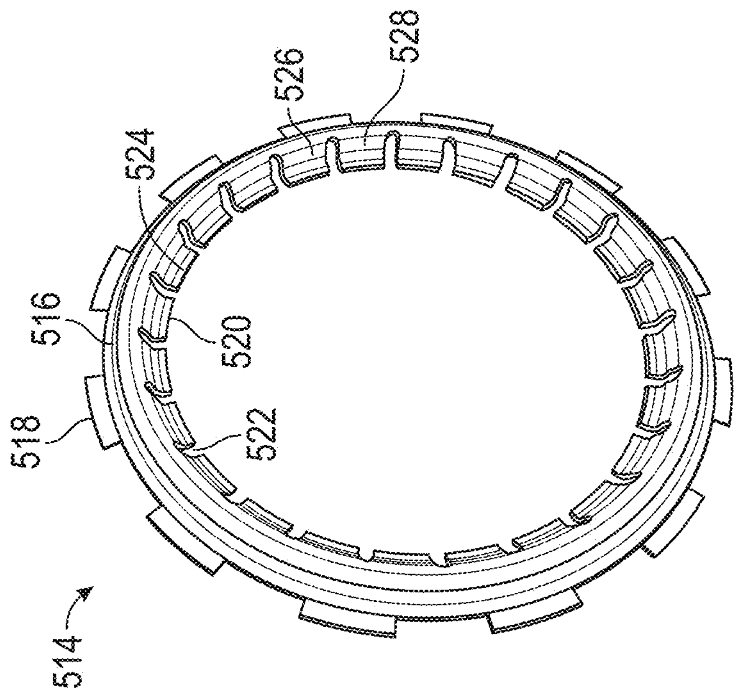
FIG. 8E illustrates a portion of the damper shown in FIGS. 8B and 8C.
Figure 8D:
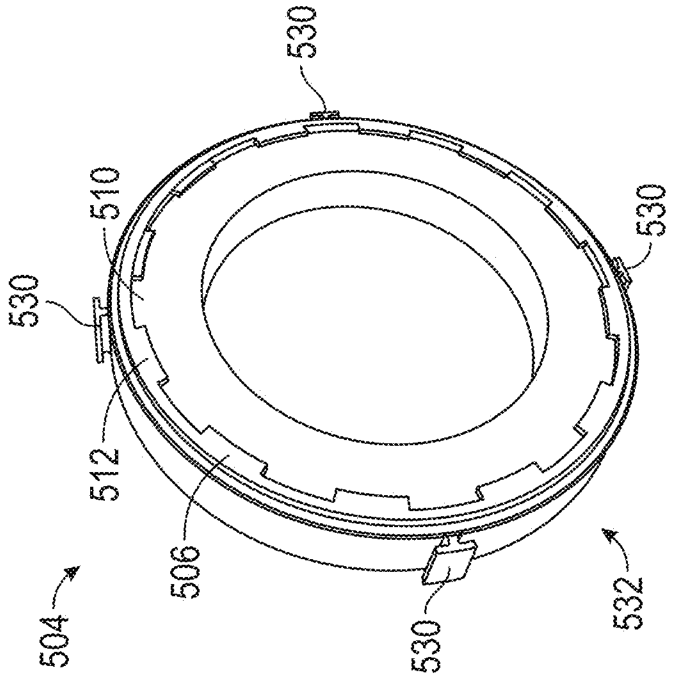
FIG. 8D illustrates a portion of the damper shown in FIGS. 8B and 8C.

Turning now to FIG. 8A, a stator 500 according to one example can comprise a sealing element 502 fixedly coupled to a seal housing 504. The seal housing 504 comprises an annular lip 506 spaced axially apart from sealing element 502 and defining a groove 508. As shown in FIG. 8D, the annular lip 506 comprises a plurality of slots 510 circumferentially spaced apart from one another and retaining tabs 512 positioned between the plurality of slots 510.

Returning to FIG. 8A, the groove 508 receives an axial foil damper 514, which extends between the seal housing 504 and the fixed housing 39. As best shown in FIG. 8E, the axial foil damper 514 comprises an annular body 516 with an arched cross section. The axial foil damper 514 further comprises a plurality of outer tabs 518 and inner tabs 520. The outer tabs 518 are each received in a corresponding slot 510 (FIG. 8D) in the annular lip 506 (FIG. 8A) of the seal housing 504 (FIG. 8A), allowing the axial foil damper 514 to be securely slotted into the groove 508 (FIG. 8A) by inserting the outer tabs 518 into the corresponding slots 510 (FIG. 8D) and then rotating the axial foil damper 514 relative to the seal housing 504 to secure the outer tabs 518 beneath the retaining tabs 512 (FIG. 8D).

As best shown in FIG. 8E, the inner tabs 520 extend radially inwards from the annular body 516 and are separated by a plurality of notches 522. The inner tabs 520 each have an inwardly disposed end portion 524 and a cusp 526 formed between the junction of each inner tab 520 with the annular body 516 of the axial foil damper 514. The plurality of cusps 526 form an annular ridge 528 that extends axially away from the seal housing 504 to contact the fixed housing 39, as shown in FIG. 8A. Because the inner tabs 520 are not connected to one another, each inner tab 520 may deflect axially independently of the other inner tabs 520, allowing for the inner tabs 520 to absorb axial deflection, such as by engine vibration or displacement to the fixed housing 39 or the sealing element 502, as shown in FIG. 8A, and as discussed above in relation to the stator assemblies 316 (FIG. 5A) and 400 (FIG. 6). This controls the relative axial positions of the fixed housing 39, the sealing element 502, and the runner (such as the runner 302 discussed above in relation to the seal assembly 300 of FIG. 5A).

Returning to FIG. 8D, the seal housing 504 can also comprise a plurality of circumferential tabs 530, disposed around the outer circumference of the seal housing 504. Two adjacent circumferential tabs 530 can, together, define a plurality of circumferential slots 532 extending around the seal housing 504.

As shown in FIG. 8B, the circumferential slots 532 can each receive a corresponding corrugated foil element 534. The corrugated foil elements 534 can comprise a plurality of peaks 536 and valleys 538, and can extend radially between the seal housing 504 and the fixed housing 39 with the peaks 536 in contact with the fixed housing 39 and the valleys 538 in contact with the seal housing 504, as best shown in FIG. 8C. Because the circumferential slots 532 extend around the full circumference of the stator 500, they can respond to radial displacement of the stator 500 (FIG. 8A) in any direction. More particularly, when the seal housing 504 or the fixed housing 39 experiences radial forces as described above, the peaks 536 and the valleys 538 of the corrugated foil elements 534 are pressed closer to each other at some point around the circumference of the seal housing 504. Thus, the corrugated foil elements 534 can absorb the radial deflection of the seal housing 504 and/or the fixed housing 39 relative to each other and control the radial alignment of the sealing element 502 relative to a runner, such as the runner 302 described above in relation to the seal assembly 300 of FIG. 5A.

In some examples, the stator 500 can also include a secondary seal 540 disposed radially outwards of the annular lip 506. As shown in FIG. 8A, the secondary seal 540 can extend over the annular lip 506 and to the axial foil damper 514. A portion of the secondary seal 540 may rest against the axial foil damper 514 to create a contact region 542 between the secondary seal 540 and the axial foil damper 514. Because the secondary seal 540 rests against, but is not connected to, the axial foil damper 514, any movement of the axial foil damper 514 in the radial "R" and/or axial "A" direction will cause movement of the axial foil damper 514 relative to the secondary seal 540 along the contact region 542. This causes friction between the axial foil damper 514 and the secondary seal 540, which resists and therefore dampens the motion of the axial foil damper 514, further controlling the radial and axial alignment of the sealing element 502 relative to a runner, such as the runner 302 described above in relation to the seal assembly 300 of FIG. 5A. The secondary seal 540 may also form a seal between the axial foil damper 514, and the bearing compartment 120 (FIG. 2), providing an additional barrier to prevent lubricant from leaking past the stator (that is, the rotationally static portions of the seal assembly) into other engine compartments, such as the pressurized compartment 124 (FIG. 2). The secondary seal 540 is typically an elastomeric or otherwise soft and flexible material and may be selected for a combination of friction and sealing properties.

In some examples, the movement of the sealing element relative to the runner can be dampened by isolating or dampening the housing of the sealing element to minimize its motion relative to the other portions of the stator.

Figure 9:
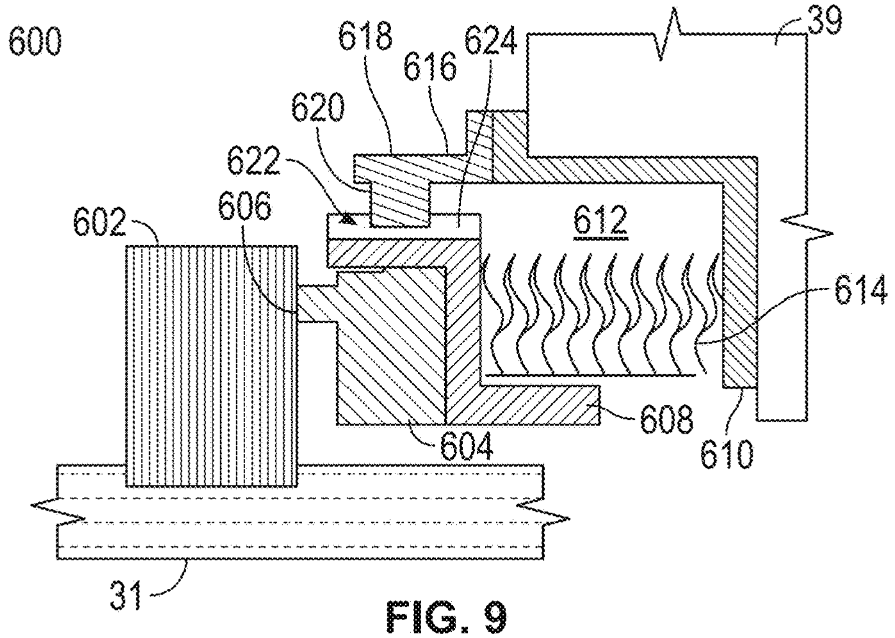
FIG. 9 illustrates a seal assembly according to another example, having a damper disposed between the stator interface and the sealing element, according to one example.
Figure 10:
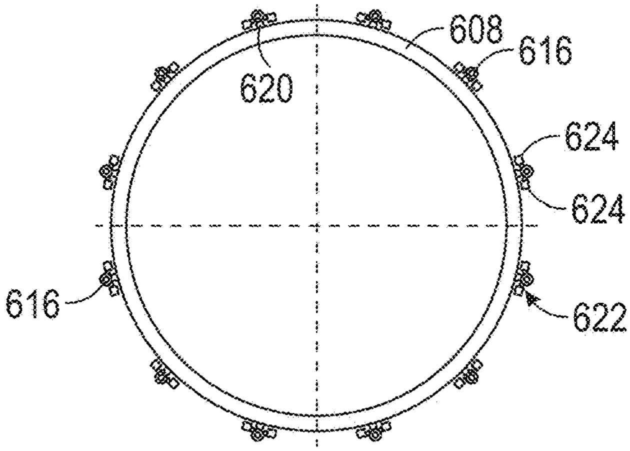
FIG. 10 illustrates the damper of FIG. 9 along a centerline axis.
Figure 11:
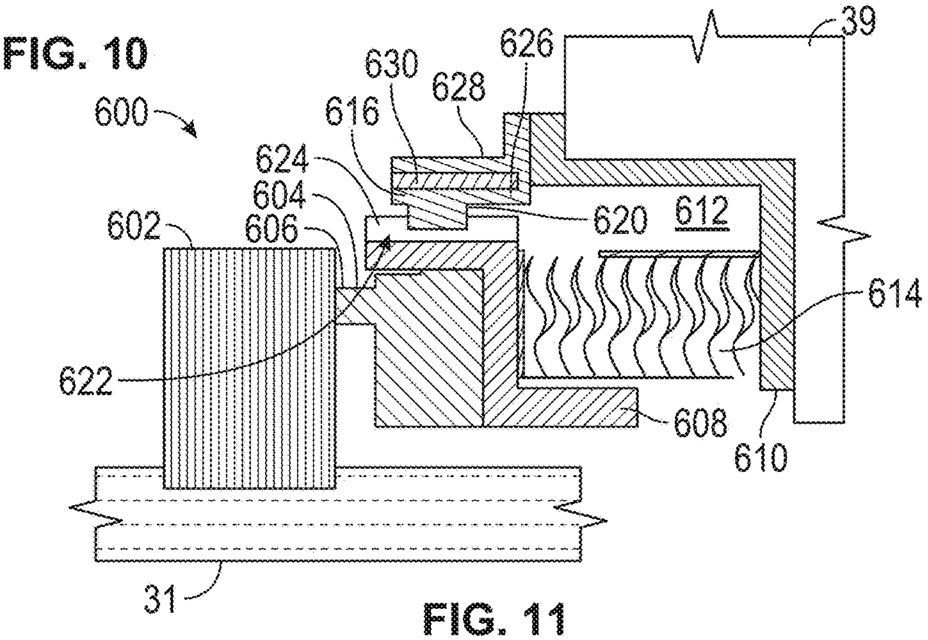
FIG. 11 illustrates a seal assembly according to another example, having a damper between the stator interface and the sealing element, according to another example.

FIGS. 9-11 show an example seal assembly 600 with an isolated or dampened seal housing 608. As shown in FIG. 9, the seal assembly 600 comprises a runner 602, fixedly coupled to the rotating shaft 31 and configured to rotate with the rotating shaft 31 when the turbomachine (such as turbomachine engine 10 of FIG. 1) is in an operational state. The seal assembly 600 also includes a sealing element 604, axially spaced apart from the runner 602 and forming a seal interface 606 therebetween.

The sealing element 604 is also statically coupled to the seal housing 608, which together with a stator interface 610 defines a spring chamber 612. A spring element 614 can be disposed in the spring chamber 612, axially spacing the seal housing 608 away from the stator interface 610 and allowing the position of the sealing element 604 relative to the stator interface 610 and/or the runner 602 in a way substantially similar to that described in relation to seal assembly 300 of FIG. 5A.

As shown in FIG. 9, the seal assembly 600 also includes one or more damping arms 616 extending between the stator interface 610 and the seal housing 608 and positioned radially outwards from the seal housing 608. The damping arms 616 can comprise an axially extending member 618 and a radially extending tongue 620. The radially extending tongue 620 of each damping arm 616 can extend into a corresponding groove 622 formed in the outer circumference of the seal housing 608.

The grooves 622 in the outer circumference of the seal housing 608 can be sized so that the tongue 620 of the corresponding damping arm 616 frictionally engages an inner wall portion 624 of the groove 622. In this way, when the engine fixed housing 39 and/or the sealing element 604 experience an axial shock or displacement, the tongue 620 of each damping arm 616 slides axially within the groove 622, and friction between the tongue 620 and the inner wall portion 624 of the groove 622 resists the axial displacement of the sealing element 604 and/or the seal housing 608 relative to the runner 602 and the fixed housing 39, thereby controlling the relative positioning between the sealing element 604 and the runner 602.

As shown in FIG. 10, the seal assembly 600 can comprise a plurality of damping arms 616 spaced circumferentially apart from one another around the seal housing 608 and a corresponding plurality of grooves 622, arranged such that the plurality of grooves 622 and damping arms 616 forms a plurality of paired grooves 622 and damping arms 616. Each paired groove 622 and damping arm 616 can thus have a tongue 620 extending into each groove 622 and engaging the inner wall portion 624 of the groove 622. It is to be appreciated that, while FIG. 10 shows a seal assembly 600 having 12 pairs of damping arms 616 and grooves 622, the seal assembly 600 can comprise a different number of pairs of damping arms 616 and grooves 622, depending on the size of the sealing element 604 and other factors such as the operational resonant frequency of the turbomachine. In some examples, the seal assembly 600 can comprise 2-16 pairs of damping arms 616 and grooves 622, such as 2, 3, 4, 5, 6, 7, 8, 9, 10, 11, 12, 13, 14, 15, or 16 pairs of damping arms 616 and grooves 622.

Because the number of tongues 620 and corresponding grooves 622 can be varied as previously described, and because each tongue 620 and corresponding groove 622 will variably contact one another, the seal assembly 600 may be resistant to harmonic forcing, which can drive the seal housing 608 into resonance. Resonant behavior potentially leads to large amplitude oscillations of the seal structure which increases the probability of failure due to either rubbing between the rotor and the seal face, rubbing of various interfaces within the seal, increased fatigue loading on the seal, or any combination thereof.

In some examples, as illustrated in FIG. 11, the damping arms 616 can further comprise a first member 626 and a second member 628 disposed radially outwards from the first member 626, separated by an elastomeric layer 630 that is simultaneously in contact with the first member 626 and the second member 628. The elastomeric layer 630 can further absorb radial and axial vibrations caused by displacement or shock to the seal assembly 600 and/or the fixed housing 39, and further control the relative positioning between the sealing element 604 and the runner 602. The elastomeric layer 630 can comprise any suitable vibration damping material, including, for example, silicone rubber, Kalrez®, or any combination thereof.

Figure 12A:
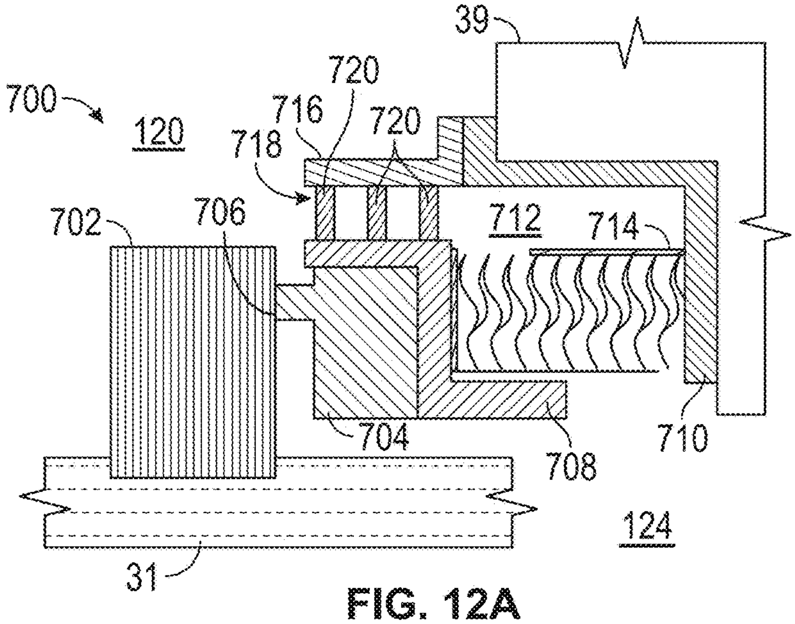
FIG. 12A illustrates a seal assembly according to another example, having a damper comprising one or more viso-elastomeric rods.
Figure 12B:
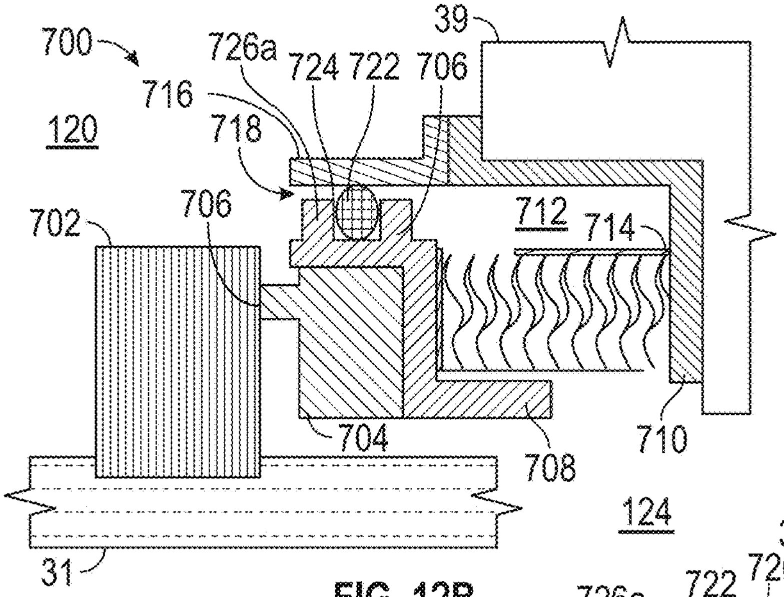
FIG. 12B illustrates a seal assembly according to another example, having a damper comprising an elastomeric ring according to one example.
Figure 12C:
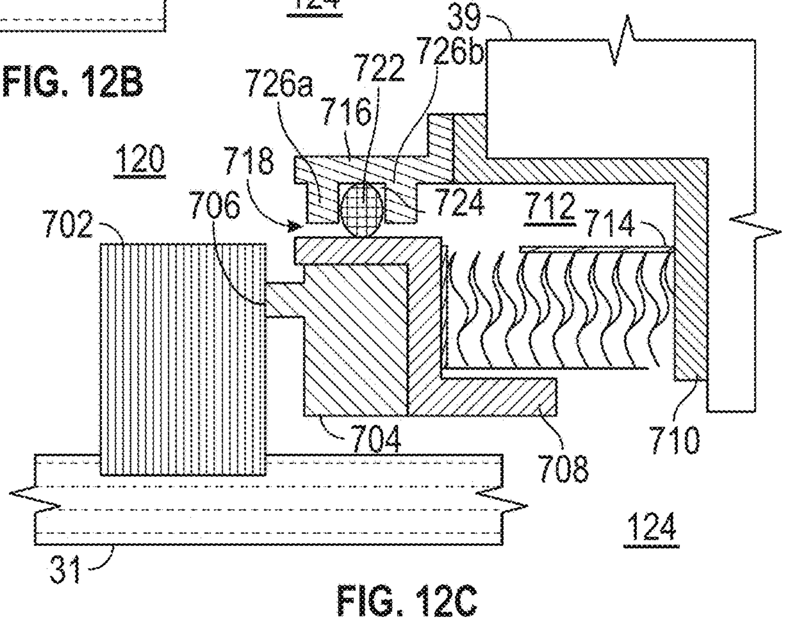
FIG. 12C illustrates a seal assembly according to another example, having a damper comprising an elastomeric ring according to another example.

FIGS. 12A-12C show another example seal assembly 700 comprising a seal housing 708 spaced apart from the fixed portions of the stator by one or more elastomeric elements. As shown in FIGS. 12A-12C, the seal assembly 700 comprises a runner 702, statically coupled to and configured to rotate along with the rotating shaft 31. The seal assembly 700 also includes a sealing element 704 axially spaced apart from the runner 702, forming a seal interface 706 between the sealing element 704 and the runner 702.

The sealing element 704 is also statically coupled to the seal housing 708, which together with a stator interface 710 defines a spring chamber 712. A spring element 714 can be disposed in the spring chamber 712, axially spacing the seal housing 708 away from the stator interface 710 and allowing the position of the sealing element 704 relative to the stator interface 710 and/or the runner 702 in a way substantially similar to that described in relation to the seal assemblies 300 and 600.

With continued reference to FIGS. 12A-12C, a damper housing 716 can be statically coupled to and extend axially from the stator interface 710. As shown, the damper housing 716 can extend alongside and radially outwards from the seal housing 708, such that a radial gap 718 is defined between the damper housing 716 and the seal housing 708.

One or more damping elements can be placed in the radial gap 718 between the damper housing 716 and the seal housing elements. In one particular example, the damping elements can comprise one or more viso-elastic rods 720 extending between the seal housing 708 and the damper housing 716, as illustrated in FIG. 12A. In some examples, such as that illustrated in FIG. 12A, the plurality of viso-elastic rods 720 can be axially spaced apart from one another to form a row of viso-elastic rods 720 in the radial gap 718. The seal assembly 700 can thus include a plurality of rows of viso-elastic rods 720, each row of viso-elastic rods 720 spaced circumferentially apart from the adjacent rows of viso-elastic rods 720 such that the plurality of viso-elastic rods 720 is disposed throughout the entire circumference of the radial gap 718.

In some such examples, the rows of viso-elastic rods 720 (or other dissipative rods) can be axially aligned or substantially axially aligned with the adjacent rows of viso-elastic rods 720, such that the viso-elastic rods 720 of each row of viso-elastic rods 720 occupies the same axial position as the corresponding elastomeric rods of the adjacent rows of viso-elastic rods 720, separated only by the circumferential spacing between them. In other such examples, certain rows of viso-elastic rods 720 can be axially offset relative to one another, such that the viso-elastic rods 720 of each row occupy a different axial position than the corresponding viso-elastic rods 720 of the adjacent rows of viso-elastic rods 720.

It is to be appreciated that, while FIG. 12A shows a seal assembly 700 with a row of viso-elastic rods 720 having three viso-elastic rods 720, it is to be understood that, in some examples, the row of viso-elastic rods 720 can comprise a different number of viso-elastic rods 720, such as 2, 4, 5, or 6 elastomeric rods circumferentially aligned with and axially spaced apart from one another. It is also to be appreciated that, in some examples, in lieu of rows of each row of viso-elastic rods 720, a single elastomeric rod can be placed at each circumferential spacing around the seal housing 708.

When the seal housing 708 moves in the radial "R" direction relative to the damper housing 716 (and therefore relative to the fixed housing 39), it can only do so by compressing at least some of the viso-elastic rods 720 disposed along the side of the seal housing 708 moving radially towards the damper housing 716 as the radial gap 718 narrows. In such a case, the force needed to compress the viso-elastic rods 720 to accommodate the movement of the seal housing 708 relative to the damper housing 716 is absorbed and the motion of the seal housing 708 relative to the damper housing 716 is reduced. Thus, the viso-elastic rods 720 absorb vibration and reduce misalignment of the sealing element 704 and the runner 702.

When the seal housing 708 moves in the axial "A" direction relative to the damper housing 716 (and therefore relative to the fixed housing 39), it can only do so by shearing at least some of the viso-elastic rods 720 in an axial direction, because the viso-elastic rods 720 are in contact with the seal housing 708 at one end and the damper housing 716 on the other end. In such a case, the force needed to shear the viso-elastic rods 720 in the axial direction to accommodate the movement of the seal housing 708 relative to the damper housing 716 is absorbed and the motion of the seal housing 708 relative to the damper housing 716 is reduced. Thus, the viso-elastic rods 720 absorb vibration and reduce misalignment of the sealing element 704 and the runner 702.

When the seal housing 708 moves circumferentially (that is, when it rotates) relative to the damper housing 716 (and therefore relative to the fixed housing 39), it can only do so by shearing at least some of the viso-elastic rods 720 in a circumferential direction, because the viso-elastic rods 720 are in contact with the seal housing 708 at one end and the damper housing 716 on the other end. In such a case, the force needed to shear the viso-elastic rods 720 in the circumferential direction to accommodate the movement of the seal housing 708 relative to the damper housing 716 is absorbed and the motion of the seal housing 708 relative to the damper housing 716 is reduced. Thus, the viso-elastic rods 720 absorb vibration and reduce misalignment of the sealing element 704 and the runner 702.

In another example, illustrated in FIGS. 12B and 12C, the damping element disposed in the radial gap 718 between the seal housing 708 and the damper housing 716 can be an elastomeric ring 722. The elastomeric ring 722 can function in the same or substantially the same way as the viso-elastic rods 720 (FIG. 12A) described above, except for the differences described below.

As shown in FIGS. 12B and 12C, the elastomeric ring 722 can extend between the seal housing 708 and the damper housing 716 and extend circumferentially around the seal housing 708. The elastomeric ring 722 can sit within a groove 724 that extends circumferentially around the radial gap 718. The groove 724 can be formed by a first annular ridge 726*a* and a second annular ridge 726*b* axially spaced apart from the first annular ridge 726*a*. The annular ridges 726*a*, 726*b* can in some examples, such as that illustrated in FIG. 12B, extend radially outwards from the seal housing 708. In other examples, such as that illustrated in FIG. 12C, the annular ridges 726*a*, 726*b* can extend radially inwards from the damper housing 716.

The elastomeric ring 722 is thus bound in either axial direction by the annular ridges 726*a*, 726*b*, and is in simultaneous contact with the seal housing 708 and the damper housing 716. Therefore, when the seal housing 708 moves in the radial "R" direction relative to the damper housing 716 (and therefore to the fixed housing 39), at least some portion of the elastomeric ring 722 must radially compress to accommodate the relative movement of the seal housing 708 and the damper housing 716. Likewise, when the seal housing 708 moves in the axial "A" direction or circumferentially relative to the damper housing 716 (and therefore to the fixed housing 39), at least some portion of the elastomeric ring 722 must shear to accommodate the relative movement of the seal housing 708 and the damper housing 716. As described above regarding the viso-elastic rods 720 shown in FIG. 12A, this reduces the movement of the seal housing 708 relative to the damper housing 716, and thus absorbs vibration and reduces misalignment of the sealing element 704 and the runner 702.

The viso-elastic rods 720 and/or the elastomeric rings 722 described above and shown in FIGS. 12A-12C can comprise any elastomeric material of sufficient stiffness and temperature resistance. In some examples, the elastomeric rods 720 and/or the elastomeric rings 722 can comprise silicone rubber or Kalrez®, but it is to be understood that any elastomeric material with a suitable combination of physical and thermal properties could be used instead.

For each example having an elastomeric dampening element disposed between the seal housing 708 and a damper housing 716 extending from the stator interface 710, the addition of the elastomeric damping element further provides radial support for the seal housing 708 and can thus help reduce sag or tilt of the seal housing 708 relative to the stator interface 710.

While the examples illustrated in FIGS. 12A-12C show the elastomeric damping element disposed on the side of the seal assembly 700 that is open to the bearing compartment 120, it is also to be understood that, in other examples, the elastomeric damping element (and the damper housing 716) can be placed on the side of the seal assembly 700 that is open to the pressurized compartment 124.

Figure 13A:
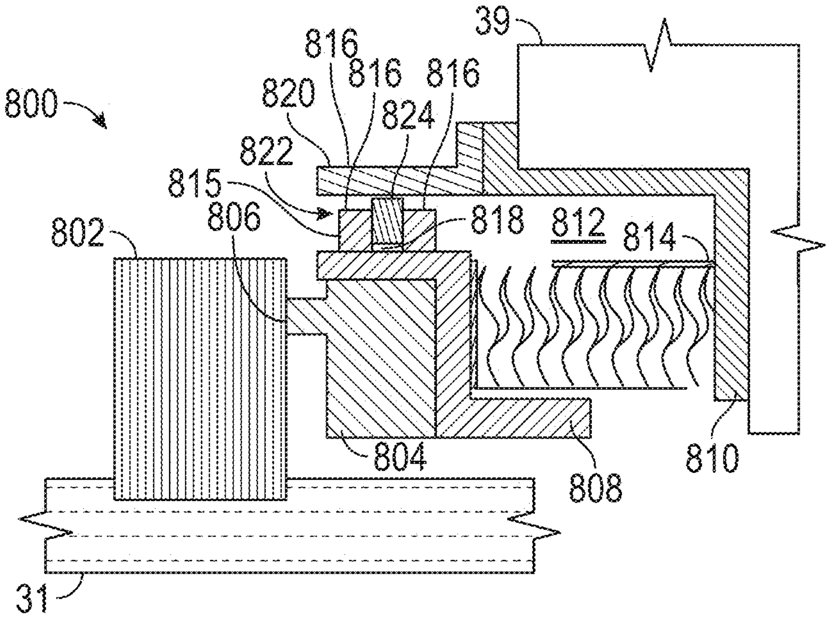
FIG. 13A illustrates a seal assembly according to another example, having a damper comprising a piston ring and piston.
Figure 13B:
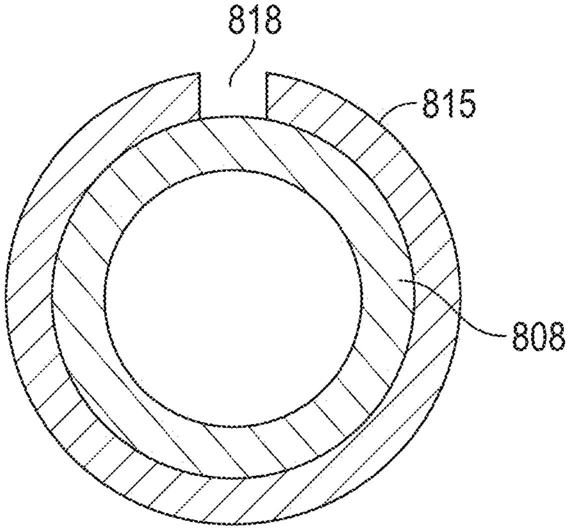
FIG. 13B illustrates the piston ring component of FIG. 13A.

FIGS. 13A and 13B show another example seal assembly 800 comprising a seal housing spaced apart from the fixed portions of the stator with one or more piston elements disposed therebetween. As shown in FIG. 14A, the seal assembly 800 comprises a runner 802, statically coupled to and configured to rotate along with the rotating shaft 31. The seal assembly 800 also includes a sealing element 804 axially spaced apart from the runner 802, forming a seal interface 806 between the sealing element 804 and the runner 802.

The sealing element 804 is also statically coupled to a seal housing 808, which together with a stator interface 810 defines a spring chamber 812. A spring element 814 can be disposed in the spring chamber 812, axially spacing the seal housing 808 away from the stator interface 810 and allowing the position of the sealing element 804 relative to the stator interface 810 and/or the runner 802 in a way substantially similar to that described in relation to the seal assemblies 300, 600, and 700 of FIG. 5A, FIG. 10 and FIGS. 12A-12C, respectively.

The seal assembly 800 can also comprise a piston ring 815 disposed radially outwards of and circumferentially around the seal housing 808. The piston ring 815 can comprise two projections 816 that extend radially outwards from the seal housing 808 to define one or more grooves 818. While FIG. 13A shows an example piston ring 815 with projections 816 extending radially outwards from the seal housing 808, forming one groove 818 between them, it is to be appreciated that, in other examples, the piston ring 815 could comprise a greater number of projections 816, such as 3, 4, 5, 6, 7, or 8 projections, defining a greater number of grooves 818 between them, such as 2, 3, 4, 5, 6, or 7 grooves.

With continued reference to FIG. 13A, a piston housing 820 can be statically coupled to and extend axially from the stator interface 810. As shown in FIG. 13A, the piston housing 820 can extend alongside and radially outwards from the seal housing 808, such that a radial gap 822 is defined between the piston housing 820 and the seal housing 808. A piston element 824 extends radially inwards from the piston housing 820 and is received by a corresponding groove 818. The piston element 824 having an interference fit on the inner diameter of the piston housing 820. It should also be noted that piston element 824 can extend radially inward in an integral circumferential groove 818 created in the seal housing 808. While FIG. 13A shows a seal assembly 800 having a single groove 818 to receive a single piston element 824, it is to be appreciated that, in examples having a greater number of grooves 818, a correspondingly greater number of piston elements 824 can extend radially inwards from the piston housing 820, forming a row of piston elements 824.

The piston element 824 is tightly sized to fit within the groove 818, while contacting the axial walls of the groove 818. Thus, when the seal housing 808 moves in the radial "R" direction relative to the stator interface 810 (and thus relative to the fixed housing 39), the outer periphery of the piston element 824 slides along the walls of the groove 818. The friction between the piston element 824 and the groove 818 resists the movement of the seal housing 808 relative to the stator interface 810. This reduces the movement of the seal housing 808, and thus absorbs vibration and reduces misalignment of the sealing element 804 and the runner 802.

Because the piston element 824 is bounded in both axial directions by the piston ring 815, any axial motion of the seal housing 808 relative to the stator interface 810 (and thus relative to the fixed housing 39) is resisted by the contact between the piston element 824 and the piston ring 815. This reduces the movement of the seal housing 808, and thus absorbs vibration and reduces misalignment of the sealing element 804 and the runner 802.

Figure 14:
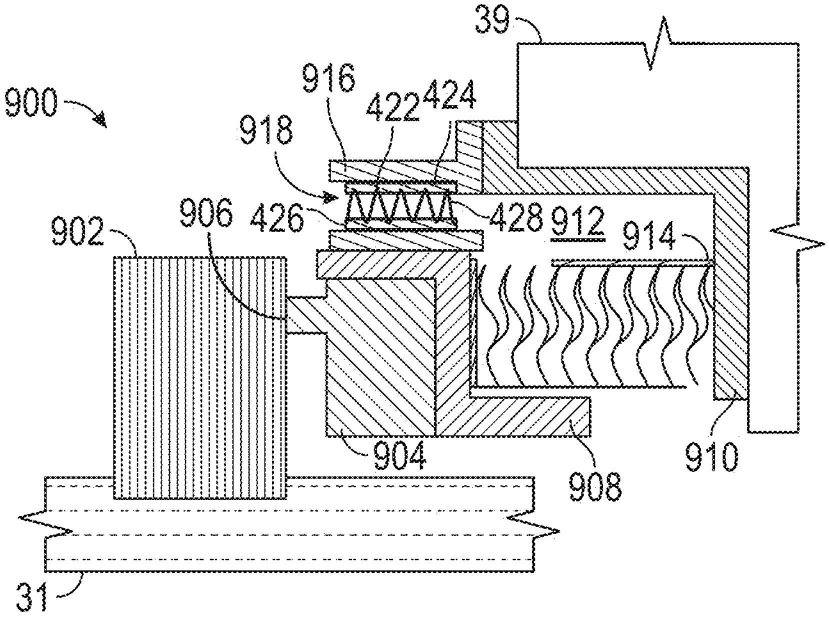
FIG. 14 illustrates a seal assembly according to another example, having a damper comprising an axial foil damper.

FIG. 14 shows another example seal assembly 900 comprising a seal housing 908 spaced apart from the fixed portions of a stator interface 910 with a radial foil damper positioned between the seal housing 908 and the stator interface 910. As shown in FIG. 14, the seal assembly 900 comprises a runner 902, statically coupled to and configured to rotate along with the rotating shaft 31. The seal assembly 900 also includes a sealing element 904 axially spaced apart from the runner 902, forming a seal interface 906 between the sealing element 904 and the runner 902.

The sealing element 904 is also statically coupled to a seal housing 908, which together with a stator interface 910 defines a spring chamber 912. A spring element 914 can be disposed in the spring chamber 912, axially spacing the seal housing 908 away from the stator interface 910 and allowing the position of the sealing element 904 to change relative to the stator interface 910 and/or the runner 902 in a way substantially similar to that described in relation to the seal assemblies 300, 600, 700 and 800 of FIG. 5A, FIG. 10, FIGS. 13A-13C, and FIG. 14A, respectively.

With continued reference to FIG. 14 a damper housing 916 can be statically coupled to and extend axially from the stator interface 910. The damper housing 916 can extend alongside and radially outwards from the seal housing 908, such that a radial gap 918 is defined between the damper housing 916 and the seal housing 908. A radial foil damper, such as the radial foil damper 422 described in greater detail above and illustrated in FIG. 7, can be positioned between the seal housing 908 and the damper housing 916. As shown in FIG. 15, the radial foil damper 422 can be positioned such that the outer sheath 424 is in contact with the damper housing 916 and the inner sheath 426 is in contact with the seal housing 908.

When the seal housing 908 moves in the axial "A" direction relative to the damper housing 916 (and therefore relative to the fixed housing 39), the inner sheath 426 moves with the seal housing 908 while the outer sheath 424 remains stationary relative to the damper housing 916. This causes the inner sheath 426 of the radial foil damper 422 to move relative to the outer sheath 424, in turn causing the corrugated foil 428 to move in shear between the inner sheath 426 and the outer sheath 424. This provides resistance to the axial motion of the seal housing 908 relative to the damper housing 916, and reduces the movement of the seal housing 908, thus absorbing axial vibration and reducing misalignment of the sealing element 904 and the runner 902.

When the seal housing 908 moves in the radial "R" direction relative to the damper housing 916 (and thus relative to the engine housing 39), at least a portion of the seal housing 908 and the damper housing 916 move closer together. This causes at least a portion of the outer sheath 424 and the inner sheath 426 of the radial foil damper 422 to press closer together, which in turn requires the elastic deformation of the corrugated foil 428. This resists and reduces the movement of the seal housing 908 relative to the damper housing 916, and reduces the movement of the seal housing 908, thus absorbing axial vibration and reducing misalignment of the sealing element 904 and the runner 902.

In the various examples described above, the seal housing can be isolated from vibrations and/or dislocations arising from various operational conditions affecting the turbomachine engine. This ameliorates sources of axial and/or radial misalignment between the sealing element and the runner, and in turn reduces the occurrence of undesired impingement between the sealing element and the runner, improves seal performance, and reduces seal wear. It will be appreciated that the various examples described above can be used individually, or in any combination with one another.

In view of the many possible embodiments to which the principles of the disclosed invention may be applied, it should be recognized that the illustrated embodiments are only preferred examples of the invention and should not be taken as limiting the scope of the invention. Rather, the scope of the disclosure is defined by the following claims.

Further aspects of the disclosure are provided by the subject matter of the following clauses:

A seal assembly for a turbomachine, the turbomachine including a rotating shaft extending along a centerline axis and a fixed housing positioned exterior to the rotating shaft in a radial direction relative to the centerline axis, the seal assembly comprising a runner statically coupled to the rotating shaft, a seal housing positioned radially outwards of the rotating shaft, a sealing element axially spaced apart from the runner and statically coupled to the seal housing, and a damper disposed between the seal housing and the fixed housing, wherein the seal housing is located between the sealing element and the fixed housing, and is movably connected to the fixed housing, wherein the seal housing is axially and radially movable relative to the runner and the fixed housing, and wherein the vibration is resistant to movement of the seal housing relative to the runner in an axial direction and radial a direction.

The seal assembly of any preceding clause, wherein a stator interface is disposed between the seal housing and the fixed housing, is axially spaced apart from the seal housing, and is coupled to the fixed housing.

The seal assembly of any preceding clause, wherein the damper comprises a coil damper disposed radially between the stator interface and the fixed housing, the coil damper comprising an annular inner coil partially enclosed by an outer sheath.

The seal assembly of any preceding clause, wherein the damper comprises a coil damper disposed axially between the stator interface and the fixed housing, the coil damper comprising an annular inner coil partially enclosed by an outer sheath.

The seal assembly of any preceding clause, wherein the damper is a radial foil damper, disposed radially between a portion of the stator interface and the fixed housing, the radial foil damper comprising an outer sheath, an inner sheath, and a corrugated foil extending between the outer sheath and the inner sheath.

The seal assembly of any preceding clause, wherein the stator interface comprises a loop member having a radially outer portion and a radially inner portion, and an axially extending gap between the first radial section and the second radial section, and wherein the radial foil damper is positioned within the axially extending gap.

The seal assembly of any preceding clause, wherein the damper is an axial foil damper, disposed radially between the seal housing and the fixed housing, the axial foil damper comprising an annular body with an axially-extending ridge and a plurality of flexible tabs extending radially inwards from the annular body.

The seal assembly of any preceding clause, wherein the seal housing comprises an annular ridge defining an annular slot positioned between the sealing element and the fixed housing, wherein the annular body of the axial foil damper further comprises a plurality of tabs extending radially outwards from the annular body, and wherein the tabs extending radially outwards from the annular body of the axial foil damper are received by the annular slot of the seal housing.

The seal assembly of any preceding clause, further comprising a secondary seal disposed radially outwards of the annular ridge, extending over the annular ridge and contacting the annular body of the axial foil damper.

The seal assembly of any preceding clause, further comprising one or more radial foil dampers disposed radially outwards of the seal housing and in mutual contact with the seal housing and the fixed housing.

The seal assembly of any preceding clause, wherein the damper comprises an elastomeric ring disposed between the seal housing and the fixed housing.

The seal assembly of any preceding clause, wherein the damper comprises one or more viso-elastic rods extending radially between the seal housing and the fixed housing.

The seal assembly of any preceding clause, wherein the one or more viso-elastic rods comprise a row of viso-elastic rods spaced apart axially from each other between the seal housing and the fixed housing.

The seal assembly of any preceding clause, wherein the damper further comprises one or more additional rows of viso-elastic rods spaced apart axially from each other between the seal housing and the fixed housing, and wherein the rows of viso-elastic rods are spaced apart circumferentially.

A turbomachine comprising a rotating shaft extending along a centerline axis, a fixed housing positioned radially exterior to the rotating shaft relative to the centerline axis and a seal assembly comprising a runner coupled to the rotating shaft, a sealing element coupled to a seal housing, and a stator interface statically connected to the fixed housing and positioned axially between the seal housing and the fixed housing, a damper disposed between the seal housing and the stator interface; wherein the stator interface comprises a damper arm and the damper arm extends axially alongside and radially outside of the seal housing, wherein the seal housing is axially and radially movable relative to the runner and the fixed housing, and wherein the vibration is resistant to movement of the seal housing relative to the runner in an axial direction and a radial direction.

The turbomachine of any preceding clause, wherein the damper comprises one or more viso-elastic rods, wherein the damper extends axially from the stator interface and is positioned radially outwards from the seal housing, and wherein the viso-elastic rods extend radially between the damper arm and the seal housing.

The turbomachine of any preceding clause, wherein the one or more viso-elastic rods comprise a row of viso-elastic rods spaced apart axially from each other between the damper arm and the seal housing.

The turbomachine of any preceding clause, wherein the damper further comprises one or more additional rows of viso-elastic rods spaced apart axially from each other between the damper arm and the seal housing, and wherein the rows of viso-elastic rods are spaced apart circumferentially.

The turbomachine of any preceding clause, wherein the damper comprises an elastomeric ring disposed between the damper arm and the seal housing.

The turbomachine of any preceding clause, wherein the elastomeric ring sits within a circumferentially extending groove that bounds the elastomeric ring in both axial directions.

The turbomachine of any preceding clause, wherein the turbomachine further comprises a piston ring disposed radially outwards of and circumferentially around the seal housing, and wherein the damper comprises a piston element extending radially inwards from the damper arm, and wherein the piston ring has a corresponding radially extending groove that receives the piston.

The turbomachine of any preceding clause, wherein the damper comprises one or more tongues extending radially inwards from the damper arm and the seal housing comprises one or more axially extending grooves that receive the one or more tongues.

The turbomachine of any preceding clause, wherein the damper comprises a plurality of tongues circumferentially spaced apart from each other, and the seal housing comprises a corresponding number of axially extending grooves that receive the plurality of tongues.

The turbomachine of any preceding clause, wherein the damper arm comprises an axially extending first member, an axially extending second member disposed radially outwards of the first rigid layer, a gap between the first rigid layer and the second rigid layer, and an elastomeric layer deposited in the gap.

We claim:

1. A seal assembly for a turbomachine, the turbomachine including a rotating shaft extending along a centerline axis and a fixed housing positioned exterior to the rotating shaft in a radial direction relative to the centerline axis, the seal assembly comprising:

a runner statically coupled to the rotating shaft;

a seal housing positioned radially outwards of the rotating shaft;

a sealing element axially spaced apart from the runner and statically coupled to the seal housing; and a damper disposed between the seal housing and the fixed housing, wherein the seal housing is located between the sealing element and the fixed housing, the seal housing is movably connected to the fixed housing, and the seal housing is axially and radially movable relative to the runner and the fixed housing, wherein the damper is resistant to movement of the seal housing relative to the runner in an axial direction and radial a direction, and wherein a stator interface is disposed between the seal housing and the fixed housing, the stator interface being axially spaced apart from the seal housing and coupled to the fixed housing.

2. The seal assembly of claim 1, wherein the damper comprises a coil damper disposed radially between the stator interface and the fixed housing, the coil damper comprising an annular inner coil partially enclosed by an outer sheath.

3. The seal assembly of claim 1, wherein the damper comprises a coil damper disposed axially between the stator interface and the fixed housing, the coil damper comprising an annular inner coil partially enclosed by an outer sheath.

4. The seal assembly of claim 1, wherein the damper is a radial foil damper, disposed radially between a portion of the stator interface and the fixed housing, the radial foil damper comprising an outer sheath, an inner sheath, and a corrugated foil extending between the outer sheath and the inner sheath.

5. The seal assembly of claim 4, wherein the stator interface comprises a loop member having a radially outer portion and a radially inner portion, and an axially extending gap between the radially outer portion and the radially inner portion, and wherein the radial foil damper is positioned within the axially extending gap.

6. A seal assembly for a turbomachine, the turbomachine including a rotating shaft extending along a centerline axis and a fixed housing positioned exterior to the rotating shaft in a radial direction relative to the centerline axis, the seal assembly comprising:

a runner statically coupled to the rotating shaft;

a seal housing positioned radially outwards of the rotating shaft;

a sealing element axially spaced apart from the runner and statically coupled to the seal housing; and a damper disposed between the seal housing and the fixed housing, wherein the seal housing is located between the sealing element and the fixed housing, the seal housing is movably connected to the fixed housing, and the seal housing is axially and radially movable relative to the runner and the fixed housing, wherein the damper is resistant to movement of the seal housing relative to the runner in an axial direction and radial a direction, and wherein the damper is an axial foil damper disposed radially between the seal housing and the fixed housing, the axial foil damper comprising an annular body with an axially-extending ridge and a plurality of flexible tabs extending radially inwards from the annular body.

7. The seal assembly of claim 6, wherein the seal housing comprises an annular ridge defining an annular slot positioned between the sealing element and the fixed housing, wherein the annular body of the axial foil damper further comprises a plurality of tabs extending radially outwards from the annular body, and wherein the tabs extending radially outwards from the annular body of the axial foil damper are received by the annular slot of the seal housing.

8. The seal assembly of claim 7, further comprising a secondary seal disposed radially outwards of the annular ridge, extending over the annular ridge and contacting the annular body of the axial foil damper.

9. The seal assembly of claim 6, further comprising one or more radial foil dampers disposed radially outwards of the seal housing and in mutual contact with the seal housing and the fixed housing.

10. A turbomachine comprising:

a rotating shaft extending along a centerline axis, a fixed housing positioned radially exterior to the rotating shaft relative to the centerline axis;

a seal assembly comprising a runner coupled to the rotating shaft, a sealing element coupled to a seal housing, and a stator interface statically connected to the fixed housing and positioned axially between the seal housing and the fixed housing; and a damper disposed between the seal housing and the stator interface, wherein the stator interface comprises a damper arm and the damper arm extends axially alongside and radially outside of the seal housing, wherein the seal housing is axially and radially movable relative to the runner and the fixed housing, and wherein the damper is resistant to movement of the seal housing relative to the runner in an axial direction and a radial direction.

11. The turbomachine of claim 10, wherein the damper comprises one or more viso-elastic rods, wherein the damper extends axially from the stator interface and is positioned radially outwards from the seal housing, and wherein the viso-elastic rods extend radially between the damper arm and the seal housing.

12. The turbomachine of claim 11, wherein the one or more viso-elastic rods comprise a row of viso-elastic rods spaced apart axially from each other between the damper arm and the seal housing.

13. The turbomachine of claim 12, wherein the damper further comprises one or more additional rows of viso-elastic rods spaced apart axially from each other between the damper arm and the seal housing, and wherein the rows of viso-elastic rods are spaced apart circumferentially.

14. The turbomachine of claim 10, wherein the damper comprises an elastomeric ring disposed between the damper arm and the seal housing.

15. The turbomachine of claim 14, wherein the elastomeric ring sits within a circumferentially extending groove that bounds the elastomeric ring in both axial directions.

16. The turbomachine of claim 10, wherein the turbomachine further comprises a piston ring disposed radially outwards of and circumferentially around the seal housing, and wherein the damper comprises a piston element extending radially inwards from the damper arm, and wherein the piston ring has a corresponding radially extending groove that receives the piston.

17. The turbomachine of claim 10, wherein the damper comprises one or more tongues extending radially inwards from the damper arm and the seal housing comprises one or more axially extending grooves that receive the one or more tongues.

18. The turbomachine of claim 17, wherein the damper comprises a plurality of tongues circumferentially spaced apart from each other, and the seal housing comprises a corresponding number of axially extending grooves that receive the plurality of tongues.

19. The turbomachine of claim 10, wherein the damper arm comprises an axially extending first member, an axially extending second member disposed radially outwards of the axially extending first member, a gap between the axially extending first member and the axially extending second member, and an elastomeric layer deposited in the gap.

* * * * *